(12) United States Patent
Fleury et al.

(10) Patent No.: US 9,206,291 B2
(45) Date of Patent: Dec. 8, 2015

(54) HYBRID COMPOUNDS CONTAINING POLYSACCHARIDE(S) AND AT LEAST ONE POLYOXYALKYLENE, METHOD FOR PREPARING SAME, AND APPLICATIONS THEREOF

(75) Inventors: Etienne Fleury, Irigny (FR); Morgan Tizzotti, Bandol (FR); Mathias Destarac, Toulouse (FR); Marie-Pierre Labeau, Burlington, NJ (US); Thierry Hamaide, Vienne (FR); Eric Drockenmuller, Lyons (FR)

(73) Assignee: RHODIA OPERATIONS, Aubervilliers (FR)

( * ) Notice: Subject to any disclaimer, the term of this patent is extended or adjusted under 35 U.S.C. 154(b) by 637 days.

(21) Appl. No.: 12/742,880

(22) PCT Filed: Nov. 14, 2008

(86) PCT No.: PCT/EP2008/065619
§ 371 (c)(1),
(2), (4) Date: Jul. 13, 2010

(87) PCT Pub. No.: WO2009/063082
PCT Pub. Date: May 22, 2009

(65) Prior Publication Data
US 2010/0273994 A1    Oct. 28, 2010

(30) Foreign Application Priority Data

Nov. 16, 2007 (FR) ..................... 07 59116

(51) Int. Cl.
| | |
|---|---|
| *C07H 19/056* | (2006.01) |
| *C07H 5/06* | (2006.01) |
| *C08B 37/00* | (2006.01) |
| *C08B 37/08* | (2006.01) |
| *C12P 19/04* | (2006.01) |
| *A61K 31/715* | (2006.01) |
| *C08G 81/00* | (2006.01) |
| *C08G 65/325* | (2006.01) |
| *C08L 71/02* | (2006.01) |

(52) U.S. Cl.
CPC ............ *C08G 81/00* (2013.01); *C08B 37/0096* (2013.01); *C08G 65/325* (2013.01); *C08L 71/02* (2013.01)

(58) Field of Classification Search
CPC .. C08B 37/0096; C08G 65/325; C08G 81/00; C08L 71/02; C08L 5/00
USPC ............... 536/123.1, 55.1, 20, 102, 56, 28.7; 514/54, 55, 57, 60
See application file for complete search history.

(56) References Cited

U.S. PATENT DOCUMENTS

| 7,074,919 B2 | 7/2006 | Aubay et al. |
| 7,375,234 B2 | 5/2008 | Sharpless et al. |
| 2010/0143980 A1 * | 6/2010 | Balagurunathan et al. ... 435/101 |

FOREIGN PATENT DOCUMENTS

| WO | WO 2005118625 | 12/2005 |
| WO | 2007030460 | 3/2007 |
| WO | WO 2008103618 A1 * | 8/2008 |

OTHER PUBLICATIONS

Hasegawa et al. (Carbohydrate Research 341 (2006) 35-40.*
Deng, et al; *Synthesis of ABC-type miktoarm star polymers by "click" chemistry ATRP and ROP*; European Polymer Journal (2007) vol. 43, pp. 1179-1187.
Gao, et al; *Synthesis of Molecular Brushes by "Grafting onto" Method: Combination of ATRP and Click Reactions*; Journal of American Chemical Society (2007) vol. 129; pp. 6633-6639.
Gungor, et al; *Heteroarm H-Shaped Terpolymers Through Click Reaction*; Journal of Polymer Science; Part A: Polymer Chemistry; (2007) vol. 45, pp. 1056-1065.
Hasegawa, et al; *'Click chemistry' on polysaccharides: a convenient, general, and monitorable approach to develop (1→3)-$\beta_D$-glucans with various functional appendages*; Carbohydrate Research; vol. 341 (2006); pp. 35-40.
Huisgen, et al; *Einige Beobachlungen zur Addition organischer Azide an CC-Dreifachbindungen*; Chem. Ber. vol. 98; (1965), pp. 4014-4021.
Huisgen, et al; *Kinetik der Additionen organischer Azide an CC-Mehrfach-bindungen*; Chem. Ber. vol. 100; (1967), pp. 2494-2507.
Ikeda, et al; *Instantaneous Inclusion of a Polynucleotide and Hydrophobic Guest Molecules into a Helical Core of Cationic $\beta$-1,3-Glucan Polysaccharide*, Journal of American Society (2007) vol. 127, pp. 3979-3988.
Liebert, et al; *Click Chemistry with Polysaccharides*, Macromol, Rapid Commun. (2006) vol. 27, pp. 208-213.
Link, et al; *Presentation and Detection of Azide Functionality in Bacterial Cell Surface Proteins*; Journal of American Chemical Society (2004); vol. 126; pp. 10598-10602.
Lutz, et al; *Modern trends in polmer biconjugates design*; Progress in Polymer Science; vol. 33, Aug. 21, 2007; pp. 1-39.

(Continued)

Primary Examiner — Shaojia Anna Jiang
Assistant Examiner — Michael C Henry
(74) Attorney, Agent, or Firm — Hunton & Williams LLP

(57) ABSTRACT

The invention relates to novel hybrid compounds containing at least one polysaccharide entity (PS), such as guar, in which at least one hydroxyl function is substituted by at least one A polyoxyalkylene entity (PEG). The swivel Ro between the entity PS and the entity A is obtained by click chemistry and has the following formula (IL1) or (IL2), in which Z is a carbon or nitrogen atom. These hybrid compounds can be used as emulsifiers, particularly in cosmetics.

20 Claims, 5 Drawing Sheets

(56) References Cited

OTHER PUBLICATIONS

Malkoch, et al; *Orthogonal Approaches to the Simultaneous and cascade Functionalization of Macromolecules Using Click Chemistry*, Journal of American Chemical Society (2005) vol. 127, pp. 14942-14949.

Tankam, et al; *Alkynyl polysaccharides: synthesis of propargyl potato starch followed by subsequent derivatizations*; ScienceDirect; Carbohydrate Research; vol. 342 (2007); pp. 2049-2060.

Tankam, et al; *Modification of methyl O-propargyl-D-glucosides: model studies for the synthesis of alkynyl based functional polysaccharides*; Carbohydrate Research; vol. 342 (2007); pp. 2031-2048.

\* cited by examiner

HYBRID COMPOUNDS CONTAINING POLYSACCHARIDE(S) AND AT LEAST ONE POLYOXYALKYLENE, METHOD FOR PREPARING SAME, AND APPLICATIONS THEREOF

CROSS-REFERENCE TO RELATED APPLICATIONS

This application is the U.S. National Phase of International Application Number PCT/EP2008/065619 filed Nov. 14, 2008, which claims priority to French Application No. FR 0759116, filed Nov. 16, 2007, each of which is incorporated by reference herein in its entirety.

FIELD OF THE INVENTION

The present invention relates to novel hybrid structures comprising at least one polysaccharide entity (PS)—for example oligomer or polymer—and at least one hydrocarbon or mineral polyoxyalkylene (POA) entity A. The bond or bonds between this entity PS and this entity A are obtained according to the chemical mechanism denoted by the name "click chemistry", in which an azide reactive unit reacts with a reactive unit of alkynyl or nitrile type, in order to form a linking unit (Ro) of triazole or tetrazole type.

The invention also relates to the process for obtaining these hybrid structures and also to their applications as emulsifying, dispersant and/or rheological compounds, for example.

Finally, also targeted by the invention are synthons, that is to say the intermediate products bearing functional groups of azide and/or alkynyl and/or nitrile type involved in the preparation of these hybrid structures.

PRIOR ART AND TECHNICAL PROBLEM

The polysaccharides more especially, but non-limitingly, in question according to the present invention (entity PS) comprise oligosaccharides or polysaccharides (which are linear, branched or cyclic) at least partly constituted by at least three, preferably at least 10 monosaccharide units, joined together by osidic bonds.

These polysaccharides PS have a certain advantage considering their physicochemical properties (hydrophilic, hydrolyzable, bioresorbable, etc.), their chemical complexity that offers multiple possibilities in terms of structure and of properties, their great availability and their natural origin, inter alia. This natural origin may render them particularly attractive from an environmental and/or toxicological and/or commercial viewpoint. Thus the applications of polysaccharides such as starchy products and derivatives thereof or cellulose products and derivatives thereof are multiple.

Polysaccharides, due to the presence of their numerous hydroxyl functional groups, may develop strong intra-molecular or intermolecular interactions, both in a hydrophobic medium and in a hydrophilic medium. This molecular recognition type behavior makes it possible to obtain organizations of gel type and/or to favor the interactions with polar surfaces such as textiles (i.e. cotton) and the hair.

Polyoxyalkylenes (POAs)—for example polyethylene glycol (PEG) or polypropylene glycol (PPG)—make up another class of polymers of major interest in multiple industrial sectors. Besides the fact that POAs are a readily available raw material, they are also characterized by their hydrophilic properties, their biocompatibility and their reactivity.

It could therefore be advantageous to have industrial quantities of hybrid structures based on PS and on POA which could, for example, be of use as emulsifiers that can be used, in particular, in cosmetic compositions such as, for example, skincare compositions, suntan treatment and protection compositions, shampoo compositions, deodorant and/or antiperspirant compositions, for example in stick, gel or lotion form, inter alia.

In the present document, the POA units capable of being present in the aforementioned hybrid structures are symbolized by the following general formula:

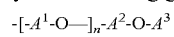

where n is an average number greater than or equal to 0, $A^1$ and $A^2$, which are identical or different, are optionally substituted divalent alkylene groups, $A^3$ is a hydrogen atom, an optionally substituted aryl or alkyl group or another entity PS.

It is known to react ethylene or propylene oxide, in the presence of NaOH, over polysaccharides with the free hydroxyls of polysaccharides such as cellulose or galactomannans (e.g. guar). For example, hydroxypropyl cellulose, hydroxymethyl cellulose or hydroxypropyl guar are commercially available. These hydroxyalkyl substituents offer new free hydroxyl groups capable of reacting with the ethylene or propylene oxide in order to extend the side chains.

In the case of guar, only three hydroxyls are available for substitution by the ethylene or propylene oxide. Thus, the degree of substitution DS is inevitably less than or equal to 3. Furthermore, the molar substitution MS, namely the average number of moles of alkylene oxide units grafted per monosaccharide unit, is itself also less than or equal to 3 in the case of guar.

In order for a PS-POA hybrid structure to be advantageous in terms of application properties, it is advisable for the MS/DS ratio to be as high as possible.

However, it is found that in the known substitutions of ethylene or propylene oxide over polysaccharides, in the presence of NaOH, the DS, and especially the MS, is low.

Consequently, the maximum MS/DS ratio achieved to date, on an industrial scale, for cellulose derivatives of hydroxypropyl cellulose type is of the order of 4-5. This corresponds to PS-POA hybrid structures that cannot be exploited in the targeted applications, such as detergency, cosmetic formulation, textile soil release, oil recovery, treatment of metals and plastics, or agrochemistry.

PCT application WO-A-2007/030460 discloses crosslinked gels constituted of alkoxyetheramides grafted to polysaccharides. These alkoxyetheramide gels have improved viscosity properties. They may be used, in particular, in the hydraulic fracturing of oil-bearing geological formations, in paints and dyes, in cosmetic or hygiene products, as dispersants or as excipients in pharmaceutical formulations for the controlled release of an active principle. These alkoxyetheramides are, for example, guar derivatives obtained by carboxymethylation of the primary OH functional group of the pendent galactosyls of the polymannose main chain of the guar. The carboxy functional group is then esterified and the ester reacts finally with an alkoxy polyoxyalkyleneamine (Jeffamine®):

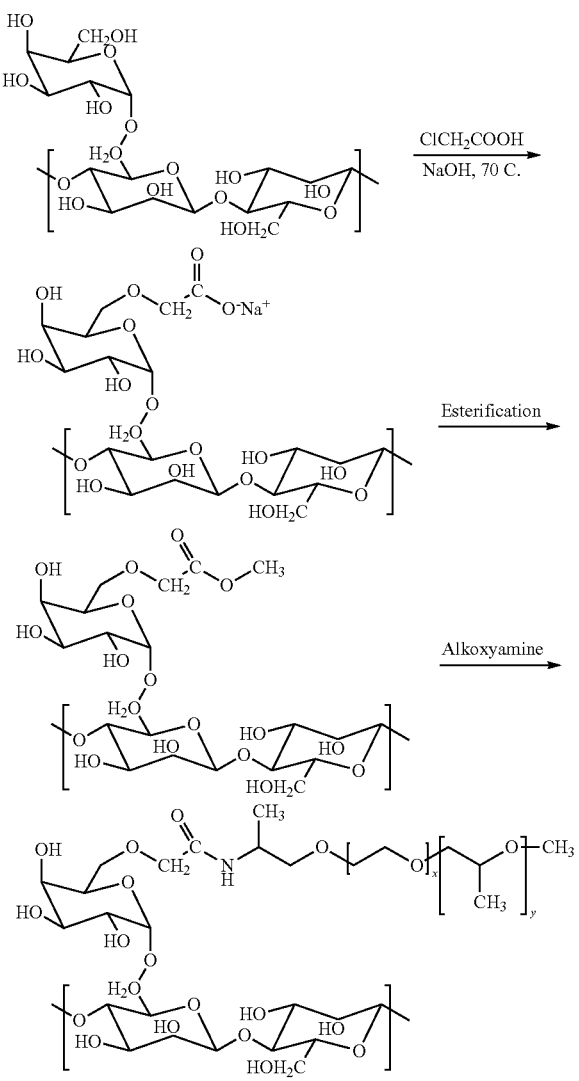

Polyoxyethylene and/or polyoxypropylene entities are thus grafted to guar, but Jeffamines® are expensive and not very accessible. Moreover, the grafting yield according to this reaction scheme is perfectible.

Furthermore, the chemical bonding mechanism known as "click chemistry" or Huisgen reaction is known. Huisgen and Szeimies [(a) Huisgen, R.; Szeimies, G.; Moebius, L. *Chem. Ber.* 1967, 100, 2494. (b) Huisgen, R.; Knorr, R.; Moebius, L.; Szeimies, G. *Chem. Ber.* 1965, 98, 4014] were the first to carry out the 1,3-dipolar cycloaddition of an azide derivative to an alkyne derivative at high temperature. The scheme for this cycloaddition is the following:

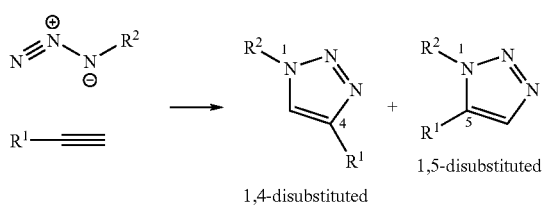

1,4-disubstituted 1,5-disubstituted

Patent application WO-A-03/101972 describes the cycloaddition reaction (known as "Huisgen" cycloaddition) between azides and alkynes, in the presence of a copper I catalyst. This reaction makes it possible to form, regiospecifically, essentially 1,4-disubstituted 1,2,3-triazole. As shown in FIGS. 3A and 3B of WO-A-03/101972, this 1,3-dipolar cycloaddition makes it possible to obtain, for example, hybrid systems (cf. products 1 to 10) comprising, on the one hand, phenyl rings and, on the other hand, inert or branched cyclic molecules that are optionally unsaturated and optionally bear hydroxyls and also a hybrid system (11) comprising a triazole linking unit that joins, on the one hand, a propanediol residue and, on the other hand, a dihydroxylated polycyclic compound. Moreover, it emerges from FIGS. 6 to 8 of WO-A-03/101972 that it is possible to functionalize amino biological molecules such as erythromycin (cf. FIG. 6), and also molecules comprising polyazide or polyalkyl rings (cf. FIGS. 7 and 8).

Application WO-A-2005/118625 describes other applications of the 1,3-dipolar cycloaddition "click chemistry" aiming to produce hybrid systems comprising an entity A corresponding to a carbohydrate coupled via a 1,2,3-triazole 5-membered cyclic linking unit to an entity B constituted by an amino acid or an amino acid analog or to an entity C that represents a polypeptide or a polypeptide analog. These hybrid systems are obtained by reacting the carbohydrate functionalized by an acetylene functional group or by an azide and an amino acid or a polypeptide functionalized by a corresponding amide or acetylene functional group. Within the meaning of WO-A-2005/118625, the term carbohydrate (cf. p.7, 1.20 to p.8, 1.2) denotes both monosaccharides and polysaccharides, in which the hydroxyl groups are optionally substituted by hydrogen, by an amine or thiol group or by heteroatomic groups.

The 1,3-dipolar cycloaddition is carried out by protecting the hydroxyl groups of the saccharide with an acetyl group and the amine group of the amino acid with a Boc group, and by using a copper catalyst and diisopropylethylamine, in a tetrahydrofuran solvent medium. The pseudo-glycoamino acids and glycopeptides obtained may be used for the treatment of bacterial infections.

It should be noted that in the systems AB or AC according to WO-A-2005/118625, the substitution by B or C of the "carbohydrate" entity A takes place exclusively on the anomeric carbon of A. Moreover, the 1,2,3-triazole 5-membered cyclic linking unit is directly bonded by a covalent bond to this carbon anomer, without a spacer unit. Finally, the constraint of protecting the sensitive groups (OH, amine) of A, B and C which is called for in the synthesis of the systems AB or AC according to WO-A-2005/118625, is extremely disadvantageous, especially from an industrial point of view.

It must therefore be noted that WO-A-2005/118625 discloses only hybrid systems obtained by "click chemistry" or 1,3-dipolar cycloaddition starting from (poly)saccharide polyols and amino acids or (poly)peptides.

OBJECTIVES OF THE INVENTION

One of the essential objectives of the present invention is to provide PS-POA hybrid compounds that are capable of being obtained easily and economically on an industrial scale and that have a high MS/DS ratio, for example of greater than 5, for example between 5 and 500.

Another essential objective of the invention is to provide novel PS-POA hybrid compounds that are capable of being obtained easily and economically on an industrial scale and that have a DS, for example, of greater than 0, or even between 0 and 3.

Another essential objective of the invention is to provide novel PS-POA hybrid compounds that are capable of being obtained easily and economically on an industrial scale and that are obtained by "click chemistry".

Another essential objective of the invention is to provide novel PS-POA hybrid compounds that are capable of being obtained easily and economically on an industrial scale and of being exploited in numerous applications: both industrial (detergency, cosmetic formulation, textile soil release, oil recovery, treatment of metals and plastics, agrochemistry) and biological applications.

Another essential objective of the invention is to provide novel PS-POA hybrid compounds that are capable of being obtained easily and economically on an industrial scale and coupled by at least one linking unit derived from a 1,3-dipolar cycloaddition of an azide or nitrile derivative to an alkyne derivative, with copper catalysis by "click chemistry".

Another essential objective of the invention is to provide novel PS-POA hybrid compounds that are capable of being obtained easily and economically on an industrial scale and that are capable of being prepared without laborious steps of protecting/deprotecting the reactants, in particular the polysaccharides, but that are also capable of being prepared in water (reactants solubilized in water), in the heterogeneous phase (polysaccharide in solid form such as in the form of powder, splits, etc. and other liquid or solubilized reactants) or in the solid phase (all solid reactants).

Another essential objective of the invention is to provide cosmetic compositions, shampoo compositions, cleaning compositions, compositions intended for treating metals and plastics or intended for agrochemistry that comprise hybrid compounds as defined in the above objectives. The invention also targets the use thereof as dispersants (dispersions of pigments, fillers, etc.), scale inhibiting additives, colloidal protectors (used especially in emulsion polymerization) and rheological agents, especially in the field of coatings (formulations of paints, or coating colors for paper coating) and in the field of oil recovery.

BRIEF DESCRIPTION OF THE INVENTION

These objectives, among others, are achieved by the present invention which firstly relates to a hybrid compound of the following formula (I): PS-Ro-A, where
PS is a polysaccharide;
Ro is a linking unit of formula (II.1) or (II.2) below:

(II.1)

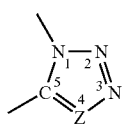
(II.2)

with Z representing a carbon or nitrogen atom;
A is a group of the following formula (III): $-[-A^1-O-]_n-A^2-O-A^3$ (III) where n is an average number greater than or equal to 0, $A^1$ and $A^2$, which are identical or different, are optionally substituted divalent alkylene groups, $A^3$ is a hydrogen atom, an optionally substituted aryl or alkyl group or an entity PS.

The invention also targets a process for obtaining, in particular, the aforementioned hybrid compound.

According to this process:
i. a synthon PS-X is used and/or prepared comprising at least one reactive unit X having at least one reactive end of formula (IV.1): —C≡E, with E=CH or N;
ii. a synthon A-Y is used and/or prepared comprising at least one reactive unit Y having at least one reactive end of formula (IV.2): —N$_3$, the reactive end (IV.2) being capable of reacting with the reactive end (IV.1);
iii. the synthon PS-X is reacted with the synthon A-Y following a cycloaddition mechanism, so as to obtain a hybrid compound PS-Ro-A comprising at least one polysaccharide entity (PS), of which at least one portion of the hydroxyl functional groups are each substituted by a -Ro-A group; with Ro and A as defined in the present document;
iv. optionally, in the case where the process is in the heterogeneous phase or in the solid phase, the solvent and the possible residues are removed by washing the solvent used for the reaction (iii); and
v. optionally, PS-Ro-A is separated from the reaction medium so as to recover it.

The invention also relates to the novel products PS-X, PS-XY, PS-Y and A-XY used as synthons in the synthesis of the PS-Ro-A hybrid compounds.

In another of its aspects, the invention targets the use of a hybrid compound according to the invention or obtained by the process according to the invention, as ingredient(s) and/or active principle(s) in compositions selected from the group consisting of:

institutional, industrial or domestic care compositions, used in the private sphere or in the public sphere (janitorial services, hotels, restaurants, public buildings, offices) especially in compositions for cleaning linen by hand or in a machine, compositions for cleaning dishes, by hand or in a machine, compositions for cleaning hard surfaces, especially floors, furniture, bathroom surfaces, toilet bowls, or kitchen surfaces;
cosmetic compositions;
compositions for the treatment of textiles, especially for the industrial treatment of textiles, for example textile soil release compositions;
coating compositions;
compositions used in the context of the construction of buildings or in the context of public works;
hydraulic fluids;
compositions used in the context of the exploitation of oil reservoirs and/or gas fields, especially drilling fluids, completion fluids, oil recovery fluids, production fluids, enhanced oil recovery fluids;
compositions for applications in the treatment of metals and plastics;
compositions for applications in the agrochemistry field;
paint compositions;
coating color compositions for paper coating;
dispersant compositions;
scale-inhibiting compositions;
colloid-protecting compositions; and
rheological compositions.

These compositions form, by themselves, another section of the invention, that is an emulsion, preferably an oil-inwater emulsion, comprising a hybrid compound according to the invention or obtained by the process according to the invention.

The invention also targets the use of a hybrid compound according to the invention or obtained by the process according to the invention as:
- a dispersant (dispersions of pigments, fillers, etc.);
- a scale-inhibiting additive;
- a colloidal protector (used, in particular, in emulsion polymerization); and
- a rheological agent, especially in the field of coatings (formulations of paints, coating colors for paper coating) and in the field of oil recovery.

DETAILED DESCRIPTION OF THE INVENTION

The PS-Ro-A Hybrid Compounds

Figure 1:
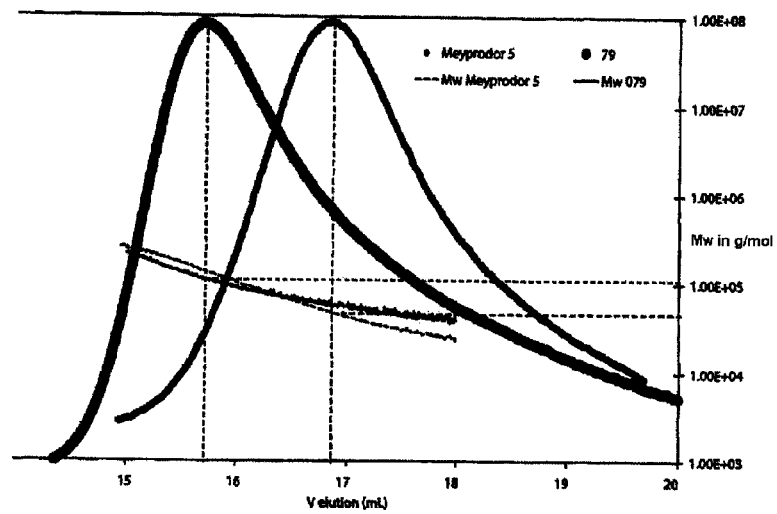
FIG. 1 depicts the results of an analysis by size exclusion chromatography (SEC) of the Meyprodor® 5 guar and of the same guar grafted with PEG grafts of 350 g·mol$^{-1}$ 79.

The PS-Ro-A hybrid compounds according to the invention can be easily synthesized on an industrial scale by "click chemistry", under mild and economical conditions. These compounds are particularly high-performance, especially due to their optimized DS, MS and MS/DS characteristics.

On the one hand, the simple grafting of -Ro-A to the PSs modifies the solubility of these polysaccharides, especially in an aqueous or aqueous-alcoholic medium. On the other hand, these PS-Ro-A hybrid compounds have, in fact, a lower critical solubility temperature compared to non-grafted PSs. Such compounds are known as "LCST", that is to say "Lower Critical Solubility Temperature" compounds. This means, for example, that at a low temperature below the LCST (e.g. an ambient temperature of 20-30° C.), these compounds are soluble in an aqueous or aqueous-alcoholic medium. On the other hand, if the temperature of the liquid medium that contains them increases, a dehydration occurs and the PS-Ro-A compounds become insoluble or much more viscous, which is contrary to the conventional effect of a temperature rise. This dehydration corresponds to folding of the PS-Ro-A chains upon themselves and/or to intercatenary bridging.

These PS-Ro-A hybrid compounds are thus heat-sensitive and may form hydrogels, above a given temperature.

The PS-Ro-A hybrid compounds according to the invention may have amphiphilic properties, as long as the polysaccharide chain(s) bear other substituents different from the -Ro-As, more specifically alkyl substituents.

Moreover, these hybrid compounds have the advantage of being biocompatible.

These novel PS-Ro-A hybrid compounds are therefore perfectly suitable for an industrial exploitation and they may open the door to numerous uses, especially in the sector of amphiphilic ingredients that can be used, in particular, in cosmetics or in detergency, for example: cosmetic care compositions, creams, lotions, gels, deodorant and antiperspirant compositions, soap compositions, shampoo compositions, washing compositions.

The rheological properties (viscosity/LCST) of these novel PS-Ro-A hybrid compounds are advantageous, in particular for oil recovery.

Their affinity for textiles (especially cotton) and their possible amphiphilicity, makes them suitable for textile soil release compositions.

These novel PS-Ro-A hybrid compounds represent a novel group of structures that are particularly advantageous in terms of compatibility with industrial requirements, in particular of cost and of environmental impact and in terms of application.

One of the major advantages of the invention is proposing hybrid compounds whose synthesis does not require protecting sensitive groups, in particular those borne by the saccharides of the entity PS or A. Naturally, such a protection is nevertheless possible, for example to improve the solubility.

Polysaccharide PS

Preferably, at least one portion of the hydroxyl functional groups of the entity PS are each substituted by an -Ro-A group.

More preferably still, at least one portion of the constituent saccharide units of PS have at least one portion of their hydroxyl functional groups which are each substituted by an -Ro-A group.

Within the meaning of the invention, the polysaccharides PS comprise oligosaccharides (for example 3 to 10 saccharide units) and polysaccharides stricto sensu (for example, 11 to 100 000 saccharide units, preferably 11 to 50 saccharide units) and also any derivative thereof.

The saccharide carbons involved in the bond(s) with the Ro linking unit(s) may be both "anomeric" carbons and other "non-anomeric" carbons.

In any case and advantageously, the synthesis of the hybrid compound according to the invention does not require the protection of the sensitive groups borne by the saccharide carbons whatever they may be.

Generally, the repeating saccharide units of the PSs are monosaccharides, disaccharides or oligosaccharides having, for example, β-1,4, α-1,4 or α-1,6 bonds.

Thus, the repeating saccharide units of the PSs are, for example, aldoses (e.g. pentoses or hexoses), dialdoses, aldoketoses, ketoses, diketoses, and also deoxysaccharides, aminosaccharides and derivatives thereof resulting from precursors comprising potentially at least one carbonyl group.

In certain variants, the polysaccharides according to the invention may comprise repeating saccharide units of N-acetyl lactosamine type or acetylated saccharide units.

The polysaccharides according to the invention may be cyclic, linear or branched. They may be copolymers or homopolymers.

According to one noteworthy feature of the invention, the polysaccharide entity, PS which preferably comprises linear and/or branched chains, is selected from the (hydrogenated or non-hydrogenated) polysaccharides consisting of at least two, especially at least three, and preferably at least 10 monosaccharide units, the preferred polysaccharides being those selected from the group consisting of:
- the polysaccharides whose monomers are obtained from at least one of the following monosaccharides: glucose, fructose, sorbose, mannose, galactose, talose, allose, gulose, idose, glucosamine, mannoamine, galactosamine, glucuronic acid, rhamnose, rhamnose sulfate, arabinose, galacturonic acid, fucose, xylose, lyxose, ribose;
- the polysaccharides whose monomers are obtained from at least one of the following disaccharides: maltose, gentiobiose, lactose, cellobiose, isomaltose, melibiose, laminaribiose, chitobiose, xylobiose, mannobiose, sophorose, palatinose;
- the polysaccharides whose monomers are obtained from at least one of the following trisaccharides: maltotriose, isomaltotriose, maltotetraose, maltopentaose, xyloglucane, maltoheptaose, mannotriose, manninotriose, chitotriose;
- starches (preferably those having at least 5 dextrose equivalents) and derivatives thereof, including hydrolysates thereof such as maltodextrins, cyclodextrins and glucose syrups;
- celluloses;
- pectin;
- galactomannans;
- chitin and chitosan;
- bacterial polysaccharides;
- hyaluronic acid; and
- derivatives of these polysaccharides.

Advantageously, these polysaccharides may comprise, for example, more than 20 monosaccharide units or preferably more than 30 monosaccharide units or more particularly still between 50 and 100 000 monosaccharide units. Mention is made that the polysaccharides may especially be linear polysaccharides, having a sequence of more than 20, preferably of more than 30, more particularly of 50 to 100 000, monosaccharide units.

These monosaccharide units may be identical to or different from one another.

More preferably, the polysaccharide PS comprises at least one main polysaccharide chain, optionally bearing pendent saccharide groups.

These pendent saccharide groups may contain, for example, linear mono-, di-, tri-, tetra-, penta-, hexa-, hepta-, octa-, nona- or deca-saccharide units, preferably mono-, di-, tri- or tetra-saccharides.

According to one particularly preferred embodiment, the PS is chosen from galactomannans: for example the following polymers: fenugreek, mesquite, guar, tara, locust bean gum or carob, or else cassia, and derivatives thereof. The macromolecule of fenugreek, mesquite, guar, carob, etc. is constituted by a linear main chain constructed from β-D-mannose monomer sugars linked together by (1,4) bonds, and α-D-galactose side units linked to the β-D-mannoses by (1,6) bonds. Natural guar is extracted from the albumin of certain plant seeds, for example *Cyamopsis tetragonalobus.*

More preferably still, the PS is selected from galactomannans belonging to the group of the following galactomannans: carob (mannose/galactose ratio, mgr=4), guar (mgr=2), cassia (mgr=5), tara (mgr=3) and mixtures thereof.

According to the invention, the polysaccharides described above are modified by this advantageous grafting method known as "click chemistry" which results in a novel grafted polysaccharide.

Still in accordance with the invention, the polysaccharide may be modified at least one other time, before, during or after the substitution via "click chemistry" of PS by -Ro-A, for example:
- either by a functionalizing step that does not require the "click chemistry" reaction;
- or by a functionalizing step that involves the "click chemistry" reaction, with a substituent other than -Ro-A.

In other words, the hybrid compound according to the invention may comprise a polysaccharide entity PS which is advantageously substituted with at least one other group different from -Ro-A.

Such a group may especially be chosen from:
- those obtained by reduction of the carbonyl (alditol) group;
- those obtained by oxidation of one or more terminal or non-terminal groups so as to convert them, for example, to carboxylic acid groups or to carboxyalkyl (e.g. carboxymethyl) groups;
- those obtained by grafting one or more groups, for example carboxylic acid groups, carboxyalkyl (e.g. carboxymethyl) groups, hydroxyalkyl (e.g. hydroxyethyl) groups or else alkyl (e.g. methyl) groups;
- those obtained by replacing one or more hydroxy groups with a hydrogen atom, an amine group, a thiol group or a similar heteroatomic group;
- those obtained by hydrogenation;
- glycosides, namely compounds comprising at least one saccharide and at least one aglycone (non-saccharide compound), the saccharide(s) on the one hand and the non-saccharide component(s) on the other hand being coupled to one another by hydrolyzable bonds; and
- derivatives of galactomannans, in particular the derivatives of guar polymers or of carob polymers, obtained by hydrolysis of natural guar or carob, and optionally by chemical modification (derivatization).

In the modifications (functionalizations or derivatizations) by hydroxyalkylation, the derivatives produced may be, for example, oxyethylene derivatives such as hydroxyethyl guars (HEG) and hydroxyethyl celluloses (HEC), oxypropylene derivatives such as hydroxypropyl guars (HPG), hydroxyethyl celluloses (HPC) and more generally oxyalkylene derivatives such as, for example, hydroxyalkyl guars and hydroxyethyl celluloses. The reaction carried out is a hydroxyalkylation reaction. In the modifications (functionalizations or derivatizations) by carboxymethylation or cationization, the derivatives produced may be, for example, ionic (anionic or cationic) charge carriers. As examples of such derivatives, mention may be made of carboxymethyl celluloses (CMC), carboxymethyl guars (CMG), carboxymethyl starches (CMS), or guar or starch derivatives of 2-hydroxypropyltrimethylammonium chloride.

In the modifications (functionalizations or derivatizations) by alkylation or arylation, the derivatives produced may be, for example, alkyl guars or aryl guars. The reactions carried out are alkylation or arylation reactions. Mention may especially be made of butyl guars and benzyl guars.

The PSs used in the invention may have undergone several modifications besides the grafting of -Ro-A by "click chemistry". As an example of PS subjected to two different modifications, that is to say bearing two types of different groups other than the -Ro-A groups, mention may be made of: carboxyhydroxypropyl guars (CMPG) or the amphoteric structures such as 2-hydroxypropyltrimethylammonium carboxymethylchlorides (cf. WO-A-02053600).

According to one modality M1 of the invention, the hybrid compound according to the invention is characterized in that the linking unit Ro or at least one of the linking units Ro is coupled to the entity PS and/or to the entity A via a divalent -L- bond. In other words, L is a spacer unit.

Advantageously, L comprises, for example, a hydrocarbon unit and/or an atom such as O or S. Within the meaning of the invention, the expression "hydrocarbon unit" denotes a unit comprising, for example, at least one carbon atom and/or at least one hydrogen. This includes, in particular, "ester", "amide", "imine" bonds etc.

According to one modality M2 of the invention, the hybrid compound according to the invention is characterized in that none of the linking units Ro are coupled to the entity Po via a divalent -L- bond and in that said hybrid compound comprises at least one entity A free of acid(s), amine(s) and/or peptide(s) and/or analog(s) and/or derivative(s) thereof.
Group A of Formula (III): -[-A$^1$-O—]$_n$-A$^2$-O-A$^3$ Preferably, A$^1$ and/or A$^2$ correspond to ethylene —CH$_2$—CH$_2$— or to propylene —CH$_2$—CH(CH$_3$)— or else to trimethylene —CH$_2$—CH$_2$—CH$_2$— and the units -[-A$^1$-O—]$_n$ are arranged in a random or block manner.

This group POA which constitutes the entity A may also include residues of polyalkylene glycol type optionally having at least one alkyl ether end group, for example a methyl ether, butyl ether, dodecyl ether, benzyl ether or styryl ether end group.

As examples of polyalkylene glycols, mention may be made of polyoxyethylene glycols (PEG), polyoxyethylene glycol monoalkyl (e.g. methyl) ethers, polyoxypropylene glycols (PPG), polyoxypropylene glycol monoalkyl (e.g. methyl) ethers, polyoxytrimethylene glycols (PTMG) or polyoxytetraethylene glycols, etc.

All the POAs forming the entity A are advantageously linear or branched or crosslinked homopolymers, or else optionally crosslinked, linear or branched block or random copolymers.

When A is a (co)polymer, it can be envisaged that the synthron A-X or A-Y used for preparing the hybrid compound comprises a finished (co)polymer or an unfinished monomer, oligomer or polymer unit intended to grow in order to form a finished polymer after reaction with PS-Y or PS-X.

Besides the preferred forms PEG, PPG, PEG/PPG, PTMG or corresponding copolymers, the alkylenes and the alkyls capable of being included in the entity A comprise, for example, from 2 to 50 carbon atoms, preferably from 4 to 40, and more preferably from 4 to 30 carbon atoms. As examples of alkyls, mention may be made of butyl, octyl, dodecyl, octadecyl, eicosane and their corresponding divalent alkylenes. Similarly, the entity POA of the hybrid compound may comprise aryls, that is to say one or more aromatic rings, for example from C6 to C12, such as benzyls, naphthyls or styryls. In the case where A$^3$ comprises at least one entity PS in the formula (III), this corresponds to crosslinked forms, with intercatenary and/or intracatenary bridging.
Substitution of PS by -Ro-A The invention improves the prior art by optimizing the substitution of the OHs of the polysaccharide PS by -Ro-A, under mild and inexpensive industrial conditions.

When PS is branched, as is the case for the galactomannans (guar), this substitution takes place in a favored manner on the OHs of the pendent (side) osidic groups. In the case of galactomannans (guar), these are therefore the 3 OHs of the galactosyl units which are the first targets of the "click chemistry" of -Ro-A.

Within the meaning of the invention, the expression "degree of substitution DS" denotes, for example, the average number of OHs substituted per monosaccharide unit of PS.

Within the meaning of the invention, the expression "molar substitution MS" denotes, for example, the number of moles of alkylene oxide chain members grafted per monosaccharide unit.

The MS/DS ratio corresponds to the average degree of polymerization DP of the substituents -[-A$^1$-O]$_n$-A$^2$-O-A$^3$ (III) of PS. DP is equal to n+1, n being the subscript of -[-A$^1$-O—]$_n$- in the formula (III).

Therefore, according to one noteworthy feature of the invention, in ascending order of preference: the MS/DS ratio is between 5 and 500, the MS/DS ratio is between 5 and 250 and the MS/DS ratio is between 6 and 100. According to another noteworthy feature of the invention, in ascending order of preference: MS is greater than 0, MS is less than or equal to 500, MS is less than or equal to 250, and MS is less than or equal to 50.

According to another noteworthy feature of the invention, in ascending order of preference: DS is greater than 0, DS is less than or equal to 3, DS is between 0.001 and 1, and DS is between 0.01 and 0.5.
Linking Unit Ro The linking unit Ro of formula (II.1) or (II.2) is at the heart of the hybrid compounds according to the invention.

This linking unit is the result of a "click chemistry" reaction, that is to say a 1,3-dipolar cycloaddition reaction, on the one hand, of an azide derivative, the reactive end of which bears three nitrogen atoms, and, on the other hand, of an alkyne derivative (Z=C) or of a nitrile derivative (Z=N). This linking unit Ro is a 1,4-disubstituted (cf. formula II.1) or 1,5-disubstituted (cf. formula II.2) triazole (Z=C) or tetrazole (Z=N) 5-membered heterocycle.

Depending on whether the reactive functionalities of azide type, on the one hand, and of acetylene or nitrile type on the other hand, are borne by the entity PS or the entity A, this gives rise to hybrid compounds of different structures.

Thus, according to a first structure, the free valence bond of the nitrogen at position 1 in the formulae (II.1) and (II.2) connects the linking unit Ro to PS and the free valence bond of the carbon or of the atom Z at position 4 or 5 in the formulae (II.1) and (II.2) connects the linking unit Ro to A.

According to a second structure, the free valence bond of the nitrogen at position 1 in the formulae (II.1) and (II.2) connects the linking unit Ro to A and the free valence bond of the carbon or of the atom Z at position 4 or 5 in the formulae (II.1) and (II.2) connects the linking unit Ro to PS.

Naturally, the hybrid compounds according to the invention are not limited to compounds comprising a single linking unit Ro but also encompass hybrid compounds that each comprise several linking units Ro that are identical to or different from one another. These structures having several linking units Ro, which are identical to or different from one another, refer, for example, to branched multibridged products, for example of dendrimer type, in star form or other forms.
The Process This production process is that defined above. It comprises the three steps (i), (ii), (iii) and optionally (iv) and (v), which are described in detail below by way of non-limiting illustration.

This process is particularly advantageous due to its simplicity, its economy, its ecocompatibility and the multiplicity (variety) of products that it makes it possible to obtain.

This process preferably involves:
synthons PS-X comprising at least one reactive unit X having at least one reactive end of formula (IV.1.1):

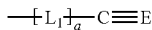

with E=CH or N, a=0 or 1, said end being connected to the residue Po via a bond $L_1$ which is a divalent hydrocarbon bond;

and synthons A-Y comprising a reactive unit Y having at least one reactive end of formula (IV.2.4):

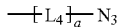

with a=0 or 1 (if a=0, then A is different from a saccharide or a peptide), said end being coupled to the residue A by a bond $L_4$ which is a divalent hydrocarbon bond.

It should be noted that, according to one variant, it is possible to use, instead of or in addition to synthons PS-X and synthons A-Y, synthons PS-Y, synthons A-X or mixed synthons PS-XY each comprising at least one reactive unit X and at least one reactive unit Y and mixed synthons A-XY each comprising at least one reactive unit X and at least one reactive unit Y. The synthons PS-XY and A-XY are capable of reacting together or else with themselves.

The synthons PS-Y, A-X, PS-XY and A-XY are defined in greater detail below:
the synthons PS-Y comprise a reactive unit Y having at least one reactive end of formula (IV.2.1):

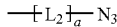

with a=0 or 1; said end being coupled to the residue Po by a bond $L_2$ which is a divalent hydrocarbon bond;
the synthons A-X comprise a reactive unit X having at least one reactive unit X having at least one reactive end of formula (IV.1.3):

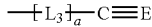

with E=CH or N, a=0 or 1 (if a=0, then A is different from a saccharide or from a peptide and if a=1, then A is different from a PDMS), said end being coupled to the residue A by a bond $L_3$ which is a divalent hydrocarbon bond;
the mixed synthons PS-XY in which the reactive units X and Y correspond to the same definitions as those given above for the synthons PS-X and PS-Y;
the mixed synthons A-XY in which the reactive units X and Y correspond to the same definitions as those given above for the synthons A-X and A-Y.

In the above formulae (IV.1.1), (IV.2.1), (IV.1.3) and (IV.2.4) the synthons Po-X, Po-Y, A-Y and A-X, if a=0, then there is no bond $L_1$, $L_2$, $L_3$ or $L_4$ (or spacer unit), but a direct valence bond (e.g. covalent bond). These synthons are intermediate products that are useful and novel and high-performance for the implementation of the aforementioned process and for obtaining hybrid compounds according to the invention. In particular, in the modality M1 according to which the linking unit Ro or at least one of the linking units Ro is coupled to the entity PS by a divalent -L- bond, the latter may comprise, in particular, at least one of the bonds $L_1$, $L_2$, $L_3$ or $L_4$ as defined above in the formulae (IV.1.1), (IV.2.1), (IV.1.3) and (IV.2.4) of the synthons in PS-X, PS-Y, A-Y and A-X. L is a spacer unit.

The simplified general formulae of the corresponding hybrid compounds may be, inter alia, those belonging to the group consisting of: PS-$L_1$-Ro-$L_2$-PS; PS-$L_1$-Ro-$L_4$-PS; PS-$L_2$-Ro-$L_3$-A; A-$L_3$-Ro-$L_4$-A; $L_1$, $L_2$, $L_3$, $L_4$ taken separately or together being identical to or different from one another.

Steps (i) and (ii): The Synthons Used
The starting synthons PS-X are, for example, obtained by reacting an alkenylated precursor comprising at least one halo (for example bromo) group with the OHs of the PS.

In the case where the substitution takes place on the anomeric carbon of the PS, an alkenylated precursor comprising at least one amine group (for example a terminal amine group) is reacted with the anomeric carbon of the PS.

According to one variant in which PS is functionalized with at least one functionalizing group belonging to the group comprising the carboxylic, carboxylate, anhydride, thiol, isocyanate and epoxide functionalizing groups, the alkenylated precursor is, for example, reacted with the functionalizing groups of the PS.

It should be noted that it is possible to envisage combining the two aforementioned possibilities for obtaining the synthons PS-X.

The preparation of the synthon PS-X may advantageously comprise the following main substeps:
a—reaction of the hydroxyls borne by PS and/or of the functionalizing group(s) of PS with an excess of at least one alkenylated precursor of the bond $L_1$ bearing a reactive (halogenated or aminated, preferably halogenated) end;
b—elimination of the precursor.

According to one preferred feature, $L_1$ corresponds to —$[(CH_2)_{q\geq 1}]$—, with a precursor corresponding to:

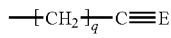
Halogen and more preferably still to:

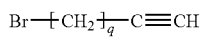

According to one alternative, $L_1$ corresponds to —[NH—$(CH_2)_{q\geq 1}$]—, with a precursor corresponding to:

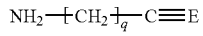

and more preferably still to propargyl amine:

Everything which has been indicated above for the synthons PS-X may be transposed for the starting synthons A-X.

The starting synthons PS-Y are, for example, obtained by reacting a bromo or tosylate precursor, for example $CBr_4$ or para-toluenesulfonyl chloride with the primary OHs of the PS.

According to one variant in which PS is functionalized by at least one functionalizing group belonging to the group comprising the carboxylic, carboxylate, anhydride, thiol, isocyanate and epoxide functionalizing groups, the alkenylated precursor is, for example, reacted with the functionalizing groups of the PS.

It should be noted that it is possible to envisage combining the two aforementioned possibilities for obtaining the synthons PS-Y.

The preparation of the synthon PS-Y may advantageously be carried out by referring to the methods described in the literature, such as for example:

For the direct substitution of —Y: -[$L_2$]-$N_3$ to the OHs of PS:
  *Macromol rapid Commun*. 2006 27, p 208-213 (Tosylation then substitution by $NaN_3$)
  Journal of the American Chemical Society, v 129, n 13, Apr. 4, 2007, p 3979-3988 (bromation then substitution by $NaN_3$)

For the substitution of —Y: -[$L_2$]-$N_3$ to the functionalizing groups of PS other than OHs, for example —COOH, use may especially be made of -[$L_2$]-$N_3$ precursors such as: $H_2N(CH_2CH_2O)_3$ $(CH_2)$ $N_3$, $H_2NCH(COOH)(CH_2)_2N_3$ or $HO(CH_2)_6N_3$. For further details, reference may be made to JACS 2005, 127, p 14942-14949 and JACS 2004, 126, 10598-10602.

The starting synthons A-Y are, for example, obtained by reacting a precursor of -[$L_2$]-$N_3$ of the halo-nitride (for example $NaN_3$) type with the OHs of A.

The preparation of the synthon A-Y may advantageously be carried out by referring to the methods described in the literature, such as for example:

chlorination route then substitution by $NaN_3$, cf. European Polymer Journal, 43 (2007), p. 1179-1187;
tosylate route then substitution by $NaN_3$, Journal of Polymer Science Part A, Vol. 45, p. 1055-1065 (2007); and
mesylate route then substitution by $NaN_3$, JACS 2007, 129, p. 6633-6639.

Regarding more specifically the starting synthons Po-XY and A-XY, reference may be made to the descriptions of structures and of preparation given above for PS-X, PS-Y, A-X and A-Y.

Step (iii): Cycloaddition

The cycloaddition mechanism [step (iii)] at the heart of the process according to the invention is a mechanism of 1,3-dipolar cycloaddition of a synthon PS-X or A-Y having azide reactive units IV.2 and a synthon A-Y or PS-X having acetylene or nitrile reactive units IV.1 ("click chemistry") under copper I catalysis, preferably in an aqueous, aqueous-organic or organic medium.

This mechanism is particularly attractive due to its simplicity, the fact that it is not hazardous for the operators or for the environment, and its low cost, inter alia.

It should be noted that, according to one variant, it is possible to use, instead of or in addition to the synthons PS-X and the synthons A-Y, mixed synthons PS-XY that each comprise at least one reactive unit X and at least one reactive unit Y and mixed synthons A-XY that each comprise at least one reactive unit X and at least one reactive unit Y, so that these synthons Po-XY and A-XY are capable of reacting together. More specifically still, it is advisable for the cycloaddition step (iii) to be carried out in an aqueous, aqueous-alcoholic or organic medium capable of solubilizing and/or swelling the synthon PS-X and/or the synthon A-Y, using at least one metal catalyst in ionized form, preferably $Cu^{++}$, in the presence of at least one $Cu^{++}$ to $Cu^+$ reducing agent, in situ, this reducing agent preferably being selected from the group consisting of: ascorbate, quinone, hydroquinone, vitamin K1, glutathione, cysteine, $Fe^{2+}$, $Co^{2+}$, metal from the group comprising Cu, Al, Be, Co, Cr, Fe, Mg, Mn, Ni and Zn, and mixtures thereof.

In practice, the metal catalyst in ionized form, preferably $Cu^{++}$, Cu is advantageously present in the form of salt(s) (ideally sulfate) comprising more preferably still at least one activator comprising, for example, at least one salt of organic acid(s) (ideally ascorbic acid) and of at least one alkali metal (ideally Na). Thus, the $CuSO_4$/sodium ascorbate system is, for example, perfectly suitable.

Furthermore, the cycloaddition step (iii) is preferably carried out in a reaction medium for which the temperature is between 20 and 100° C., preferably between 50 and 80° C., for 0.1 to 20 hours, preferably for 0.5 hour to 15 hours, and more preferably still for 1 to 8 hours.

The heating of the reaction medium is carried out by any appropriate means. Microwave irradiation may constitute, for example, one advantageous heating method.

Advantageously, the reaction medium of the cycloaddition step (iii) is an aqueous, aqueous-organic or organic medium preferably comprising at least one solvent chosen from:
  aprotic polar solvents, preferably dimethyl-formamide (DMF), dimethylacetamide (DMAc), tetrahydrofuran (THF), acetone, methyl ethyl ketone or butanone;
  protic polar solvents, preferably methanol, isopropyl alcohol (IPA) or t-butanol (t-BuOH);
  apolar solvents, preferably toluene, hexane or xylene;
  water;
  and mixtures thereof.

Optional Step (iv): Elimination of the Reaction Solvent and of Possible Residues In the case where the process is carried out in the heterogeneous phase or in the solid phase, the solvent and the possible residues are removed by washing with the solvent used for the reaction (iii).

Optional Step (v): Separation

Regarding the step (v) of separating the hybrid compound PS-Ro-A from the reaction medium, it consists, in particular, in using:
  at least one chromatography, preferably at least one silica gel chromatography, using an eluent that contains a mixture of a first polar solvent and at least a second less polar solvent, such as for example a mixture of acetonitrile and water;
  or an ultrafiltration in order to remove the unreacted polyethers and other small molecules;
  or a precipitation in a solvent which is a good solvent for the unreacted polyethers but a poor solvent for the polysaccharide;
  and/or at least one evaporation in order to dry the product—if necessary.

The Synthons

According to another of these aspects, the present invention relates to the synthons PS-X, PS-Y, A-X, A-Y, PS-XY and A-XY according to the invention, taken as they are and as defined above in the context of the description of the process according to the invention.

Applications

The present invention also targets the use of a hybrid compound as described above.

Institutional, industrial or domestic care compositions, like cosmetic compositions, may advantageously comprise at least one surfactant, especially a non-ionic, anionic, amphoteric, or cationic surfactant or a mixture.

The above compositions also constitute another subject of the invention.

In particular, these compositions may be an emulsion, preferably an oil-in-water emulsion comprising a hybrid compound according to the invention.

The invention also targets the use of a hybrid compound according to the invention or obtained by the process according to the invention, as:
- a scale-inhibiting additive;
- a colloidal protector (used, in particular, in emulsion polymerization);
- an emulsifier or coemulsifier for preparing or stabilizing emulsions;
- an agent capable of rendering compatible several compounds within a formulation;
- an agent for helping with the deposition of another compound, or as an initiator of the deposition of another compound;
- a dispersant or codispersants for preparing or stabilizing dispersions of particles, for example mineral or organic pigments, and fillers;
- an ingredient in a cosmetic formulation, which may be intended to be rinsed or not, for caring for the skin and/or hair and/or lips, for example in skincare creams or milks or oils, sun protection creams or milks, shampoos, conditioners, shower gels, makeup compositions, lipsticks, deodorants and cleansing bars (soaps);
- an agent for modifying the rheological properties of fluids, especially aqueous fluids, such as rheological agents for cosmetic formulations, paints, coating colors (coating of paper, plastics, etc.) or else as rheological agents for oil recovery; and
- agents, for example as matrices, for the protection, encapsulation and/or controlled release of active principles.

In particular, the hybrid compounds according to the invention have the advantages, in these applications, of being relatively non-irritant, of being partially biodegradable or bioresorbable, of providing a pleasant feel, and/or of providing advantageous spreading.

The hybrid compounds according to the invention may especially be present in the form of oils. They may especially be present in dispersed or solubilized form in a vector, often an aqueous vector, for example at a concentration of 10 to 90% by weight.

Other details of the invention will appear more clearly in view of the examples given below by way of indication.

EXAMPLES

Use is especially made, as a raw material denoted by "guar" below, of the product Meyprodor® 5 available from Danisco. This is a partially depolymerized guar gum having a molar mass of around 50 000 g/mol.

The reaction scheme is the following:

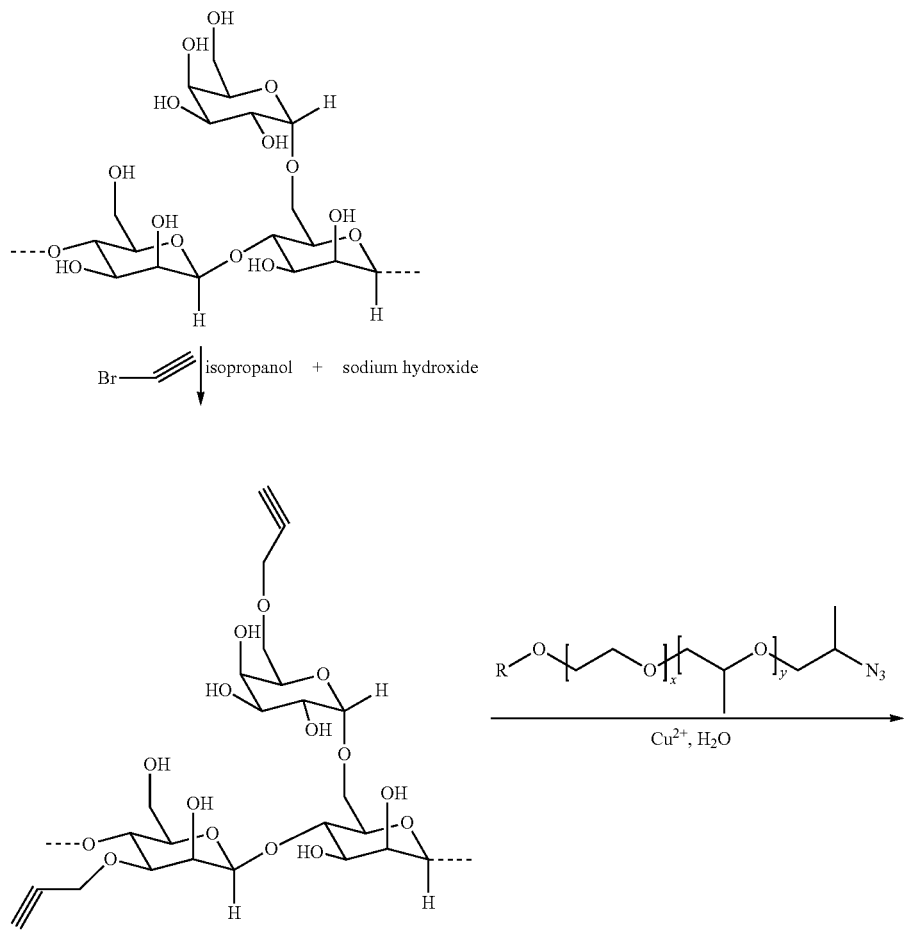

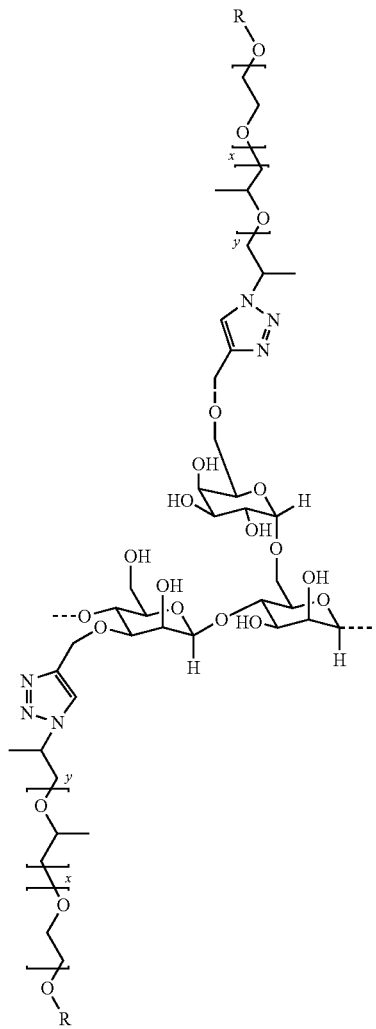

Example 1

Preparation of a Synthon of Guar Bearing an Alkyne Functional Group

Poured into a 500 ml four-necked round-bottomed flask equipped with a condenser and a Teflon paddle stirrer actuated by a motor, are 100 g of isopropanol and 6 g of guar (equivalent OH: 1.854 mol of OH per 100 g). After stirring for 20 minutes, 30.80 g of a 5 wt % aqueous solution of sodium hydroxide in water are added dropwise. The guar begins quite rapidly to swell in order to have the appearance of semolina in suspension. The stirring is fast because it makes it possible to avoid the agglomeration of the guar in particles that are too large. The whole mixture is thus left for one hour. Next, 16.80 g of a solution of propargyl bromide/toluene at a concentration of 80/20 by weight are added dropwise. The round-bottomed flask is then immersed in an oil bath at 60° C. and the reaction takes place over 24 h.

The grafting reaction of triple bonds to a guar is given below:

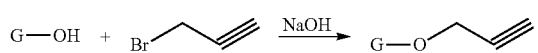

This grafting takes place both on the mannose and galactose units of the guar (PS).

Under these experimental conditions, the following molar ratios are obtained:

OH/NaOH/Br=3/1/3

Once the reaction is complete, the solid phase can easily be recovered and is dissolved in 100 ml of deionized water. The alkynylated guar synthon is then precipitated in 500 ml of isopropanol and filtered over a No. 4 frit made of silica. The entire operation is repeated once. The solid obtained is dried at 35° C. for 24 h.

Determination of the DS of Alkyne Functional Groups in the Synthon

The degree of substitution (denoted by DS) of alkyne functional groups represents the average number of alkyne functional groups per saccharide unit. Each galactosyl unit has three OH functional groups, therefore the theoretical maximum DS is equal to 3.

The proton of the triple bond has a chemical shift of 2.1 ppm in $D_2O$. These protons can be observed within the context of our study, but their number is greatly underestimated during a $^1H$ NMR analysis. The introduction of a triple bond in a guar provides hydrophobicity; it is assumed that the most substituted chains are no longer soluble, or are only partially soluble, in water.

The method developed consists in reacting the triple bonds with a water-soluble molecule comprising an azide functional group via a click chemistry reaction. This reaction being complete, the introduction of this molecule in great excess will consume all the alkyne functional groups of the guar. It is then possible to quantify the DS by observing the signal of the protons of the triazole rings formed, the guar having seen its hydrophilicity reestablished by virtue of the grafting of the hydrophilic molecule. There will be the following:

Number of alkyne protons=number of triazole protons.

The DS of the synthon is 0.4-0.5 (see example 2)

Example 2

Preparation of a Guar/PEG Hybrid

Poured into a 30 ml glass flask are 50 mg of the synthon prepared in example 1 (experimental protocol described previously, reaction for 24 h, DS is assumed to be equal to 1) and 3 ml of distilled water. After solubilization of the guar, the following are added in order: 0.06 ml of a solution of sodium ascorbate in water (100 mg/ml), 0.1080 g of azide functionalized polyoxyethylene (Gao, Matyjaszewski. JACS 2007, 129, 6633-6639) having a molar mass equal to 350 g·mol$^{-1}$ and 0.04 ml of a solution of $CuSO_4.5H_2O$ as a solution in water (10 mg/ml). The flask is covered with aluminum foil to protect the azide functional groups. The whole assembly is then immersed in an oil bath at 45° C. and the reaction takes place over 24 h.

The grafting reaction of PEG grafts to an alkyne-functionalized guar is given below.

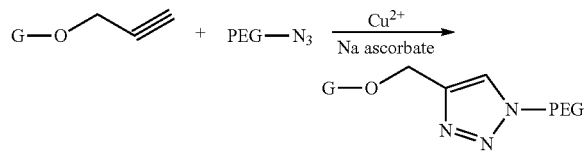

Once the reaction is complete, a yellow-colored homogeneous mixture is obtained. The whole mixture is precipitated in 20 ml of tetrahydrofuran (THF). The solid phase recovered is dried at 35° C. for 24 h.

Analysis by size exclusion chromatography (SEC) in water shows a shift of the elution peak to high masses, and also an increase of the molar mass indicating that the grafting has been successful, as can be seen in the appended FIG. 1.

The appended FIG. 1 gives the results of an analysis by SEC in $H_2O$/acetic acid (1000/1 by weight) of the Meyprodor® 5 guar and of the same guar grafted with PEG grafts of 350 g·mol$^{-1}$ (example 2). This grafted guar is given the reference 79 in FIG. 1.

The molar mass of the initial guar is around 50 000 g·mol$^{-1}$ and the molar mass of the grafted product determined experimentally is 94 700 g·mol$^{-1}$.

A $^1$H NMR analysis in $D_2O$ at 60° C. (250 MHz) makes it possible to quantify the DS with greater precision. The reference is the signal of the anomeric protons of the galactose units at 5.1 ppm calibrated at 1.3. The signal of the triazoles is observed at 8.1 ppm (integration: 1.373) and the signal of the protons of the triple bond at 2.2 ppm (integration: 0.156).

It is known that there are 2 mol of mannose units per 1.3 mol of galactose units in Meyprodor® 5.

There are 1.373 mol of PEG per 3.3 mol of units.

There are 0.156 mol of alkyne functional groups per 3.3 mol of units.

Before the "click chemistry" reaction, there were therefore 1.373+0.156=1.529 mol of alkyne functional groups per 3.33 mol of units, i.e. 0.46 mol of alkyne functional groups per 1 mol of units.

The alkyne-functionalized guar therefore has 0.46 triple bonds per galactosyl unit.

DS=0.46.

Example 3

Grafting of 2000 g·mol$^{-1}$ PEG Segments to a Guar

Poured into a 30 ml glass flask are 80 mg of guar having a DS equal to 0.48 and 5 ml of distilled water. After solubilization of the guar, the following are added in order: 0.1 ml of a solution of sodium ascorbate in water (100 mg/ml), 479.5 mg of azide-functionalized polyoxyethylene having a molar mass equal to 2000 g·mol$^{-1}$ and 0.065 ml of a solution of $CuSO_4.5H_2O$ in solution in water (10 mg/ml). The flask is covered with aluminum foil to protect the azide functional groups. The whole assembly is then immersed in an oil bath at 45° C. and the reaction takes place over 24 h.

≡/$N_3$/$Cu^{2+}$/Na asc=1/1/0.011/0.21 (mol %)

The whole mixture is then dialyzed (pore size: 3500 Da) for 3 days in a 500 ml beaker of distilled water with magnetic stirring. 1 mg of $NaN_3$ is poured into the beaker in order to prevent a possible bacterial degradation. The whole mixture is then frozen overnight and lyophilized for 24 h. 453 mg of a fine white powder are recovered.

Characterization of the Click Chemistry Products

The product is analyzed by $^1$H NMR in $D_2O$ at 60° C., by size exclusion chromatography (eluant: mixture of distilled water/acetic acid at 1000/1 by weight) and by thermogravimetric analysis under inert atmosphere of nitrogen at 20° C./min.

The $^1$H NMR ($D_2O$, 60° C., 256 scans, 250 MHz) makes it possible to calculate the DS of PEG grafts according to the method seen previously, and therefore to determine the yield of the click chemistry reaction.

Figure 2:
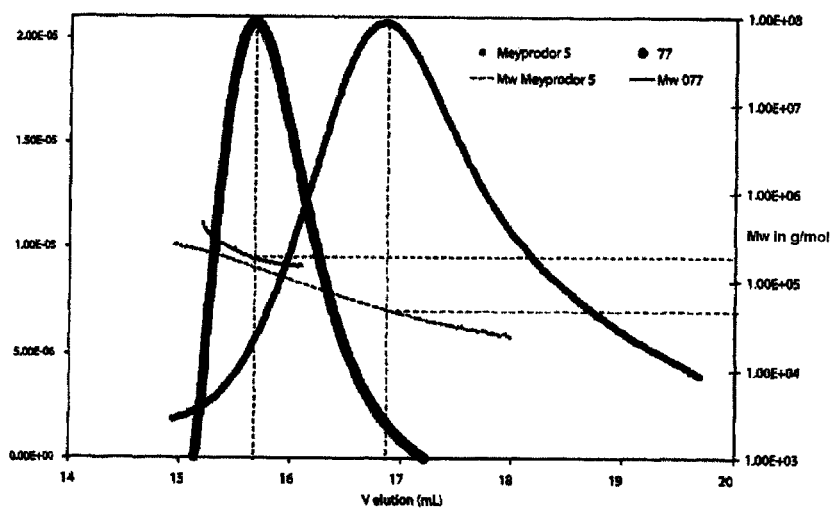
FIG. 2 depicts the results of analysis by SEC of the Meyprodor® 5 guar and of the same guar grafted with PEG grafts of 2000 g·mol$^{-1}$ 77.

The SEC makes it possible to demonstrate an increase in the molar mass of the guar. The appended FIG. 2 gives the results of analysis by SEC in $H_2O$/acetic acid (1000/1 by weight) of the Meyprodor® 5 guar and of the same guar grafted with PEG grafts of 2000 g·mol$^{-1}$ (example 3, DS=0.4). This grafted guar is given the reference 77 in FIG. 2.

A thermogravimetric analysis confirmed the structure of the guar grafted with PEG grafts of 2000 g·mol$^{-1}$ (example 3, DS=0.4).

The thermogravimetric analysis (TGA) makes it possible to verify whether the PEG 2000/guar mass fractions correspond with the results obtained with the two other methods of analysis.

TABLE 1

Characterization of a guar grafted with PEG grafts of 2000 g · mol$^{-1}$.

|  | $^1$H NMR | SEC | TGA (weight fractions) |
|---|---|---|---|
| Theoretical results | DS = 0.48 yield = 100% | $M_w$ = 181720 g · mol$^{-1}$ | PEG/guar = 84/16 |
| Experimental results | DS = 0.4 yield = 83.3% | $M_n$ = 249500 g · mol$^{-1}$ $M_w$ = 292700 g · mol$^{-1}$ $I_p$ = 1.173 | PEG/guar = 87/13 |

Example 4

Grafting of 350 g·mol$^{-1}$ and 2000 g·mol$^{-1}$ PEG Segments to a Meyprodor® 5 Guar Several products were synthesized and characterized with the aforementioned techniques. The results are collated in table 2 below. It should be noted however that the TGA analyses of the guars-g-PEG 350 g·mol$^{-1}$ cannot be used since the mass losses of the guar and of these grafts are concomitant.

TABLE 2

Characterization of guars grafted with PEG grafts of 350 or 2000 g · mol$^{-1}$ (tests 4.1 to 4.11).

|  | PEG | 350 g/mol | | | | | |
|---|---|---|---|---|---|---|---|
|  | DS | 0.09 | 0.11 | 0.2 | 0.24 | 0.306 | 0.34 |
|  | Test | 4.4 | 4.1 | 4.5 | 4.6 | 4.11 | 4.9 |
|  | $^1$H NMR | OK | OK | OK | OK | OK | OK |
| Theory | Mn in g/mol | 31303 | 32437 | 37540 | 39808 | 43550 | 45478 |
|  | PEG/guar wt % | 16/84 | 19/81 | 30/70 | 34/66 | 40/60 | 42/58 |
| Exp SEC | Mn in g/mol | 13000 | 10000 | 38500 | 31800 | 54200 | 73400 |
|  | Mw in g/mol | 63600 | 81400 | 81100 | 76100 | 83700 | 85600 |
|  | Ip | 4.886 | 8.138 | 2.108 | 2.393 | 1.546 | 1.171 |
| Exp TGA | PEG/guar wt % | x | x | x | x | x | x |

|  | PEG | 350 g/mol | | 2000 g/mol | | |
|---|---|---|---|---|---|---|
|  | DS | 0.41 | 0.44 | 0.11 | 0.4 | 0.4 |
|  | Test | 4.10 | 4.3 | 4.2 | 4.7 | 4.8 |
|  | $^1$H NMR | OK | OK | OK | OK | OK |
| Theory | Mn in g/mol | 49447 | 51148 | 61840 | 155800 | 155800 |
|  | PEG/guar wt % | 47/53 | 49/51 | 57/43 | 84/16 | 84/16 |
| Exp SEC | Mn in g/mol | 66600 | 42300 | 132400 | 191700 | 249500 |
|  | Mw in g/mol | 94700 | 45700 | 160000 | 215900 | 292700 |
|  | Ip | 1.422 | 1.082 | 1.208 | 1.126 | 1.173 |
| Exp TGA | PEG/guar wt % | x | x | 53/47 | x | 87/13 |

The tests 4.7 and 4.8 represent the same product, but the test 4.7 was precipitated in the THF whereas the test 4.8 was obtained by dialysis, then lyophilization. The precipitation in THF results in the most functionalized chains being lost.

Aqueous solutions having concentrations of 100 g·l$^{-1}$ of 2000 g·mol$^{-1}$ PEG grafted products were prepared. The monitoring of the viscosity as a function of the shear at 15° C. and 50° C. was carried out on an AR1000 rheometer (TA Instruments) with a cone-plate geometry 60 mm in diameter and with a 2 μm gap. The solutions were placed in the rheometer at a given temperature, then left at rest for 1 h before starting the analysis.

Figure 3:
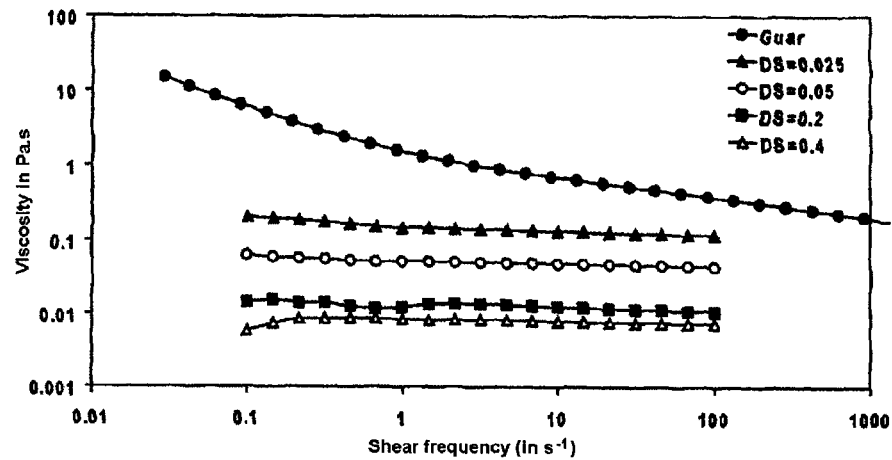
FIG. 3 depicts the viscosity of aqueous solutions of 2000 g·mol$^{-1}$ PEG grafted guar at 15° C., as a function of the shear frequency.

FIG. 3 is a graph of the monitoring of the viscosity (in Pa·s) of aqueous solutions of 2000 g·mol$^{-1}$ PEG grafted guar (100 g·l$^{-1}$) at 15° C. as a function of the shear frequency (in s$^{-1}$).

Figure 4:
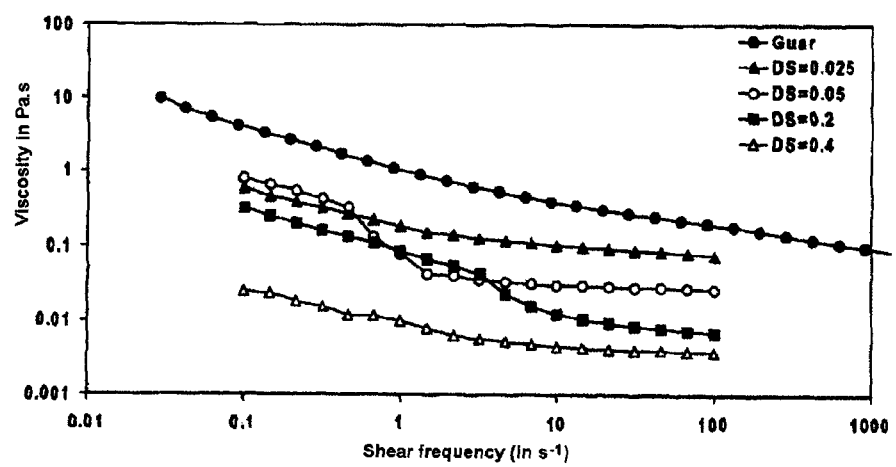
FIG. 4 depicts the viscosity of aqueous solutions of 2000 g·mol$^{-1}$ PEG grafted guar at 50° C., as a function of the shear frequency.

FIG. 4 is a graph of the monitoring of the viscosity (in Pa·s) of aqueous solutions of 2000 g·mol$^{-1}$ PEG grafted guar (100 g·l$^{-1}$) at 50° C. as a function of the shear frequency (in s$^{-1}$).

It appears that the grafting of 2000 g·mol$^{-1}$ PEG reduces the viscosity of the product in solution. This is explained by the fact that the guar concentration decreases when the degree of grafting increases. It can however be noted that the solutions left at rest at 50° C. are more viscous than those left at 15° C. This rise in viscosity disappears during an increase of the shear.

Example 5

Grafting of 1590 g·mol$^{-1}$ PEG-PPG segments to a Meyprodor® 5 Guar and Other Guars of Higher Molar Masses Several products were synthesized and characterized with the aforementioned techniques. The results are collated in table 3 below. It should be noted however that the LCST of the PEG/PPG copolymer used is around 50° C. (50% EO units, 50% PO units). The syntheses were therefore carried out at 25° C., but over 3 days instead of 24 h.

Given the heat-sensitive nature of this graft, it is expected to observe an increase in the viscosity of the aqueous solutions (water+grafted product) at around 50° C., instead of a fluidization as is the case for conventional polymer/solvent systems.

TABLE 3

Characterization of guars grafted with PEG-PPG grafts of 1590 g · mol$^{-1}$

| Guar Mn | 26200 g/mol | | | | | 65500 g/mol | | | 164000 g/mol | | |
|---|---|---|---|---|---|---|---|---|---|---|---|
| DS ($^1$H NMR) | 0.025 | 0.05 | 0.1 | 0.32 | 0.48 | 0.04 | 0.13 | 0.16 | 0.06 | 0.11 | 0.15 |
| Test | 5.12 | 5.13 | 5.14 | 5.15 | 5.16 | 5.17 | 5.18 | 5.19 | 5.20 | 5.21 | 5.22 |

TABLE 3-continued

| Characterization of guars grafted with PEG-PPG grafts of 1590 g·mol$^{-1}$ | | | | | | | | | | | |
|---|---|---|---|---|---|---|---|---|---|---|---|
| Guar Mn | 26200 g/mol | | | | | 65500 g/mol | | | | 164000 g/mol | |
| PEG-PPG/guar (wt %) | 22/78 | 37/63 | 38/62 | 74/26 | 75/25 | 28/72 | 56/44 | 61/39 | 37/63 | 52/48 | 60/40 |

The aqueous solutions of products based on guars with Mn=26 200 g/mol did not give rise to increases in the viscosities due to the molecular weight of the main chain being too low. On the other hand, the products based on the guars with Mn=65 500 g/mol and 164 000 g/mol had the desired heat-sensitive behavior.

The aqueous solutions from tests No. 5.17 to No. 5.22 were prepared so as to keep the weight concentration of guar chains, namely 50 g/l, constant. The corresponding values of the concentration of grafted products are collated in table 4 below. The monitoring of the viscosity as a function of time is carried out on an AR1000 rheometer (TA Instruments) with a cone-plane geometry having a diameter of 60 mm and a gap of 2 μm with a heating rate of 1° C./min and a shear frequency of 0.05 s$^{-1}$.

TABLE 4

| Preparation of the aqueous solutions of guars grafted with PEG-PPG grafts of 1590 g·mol$^{-1}$ (tests 5.17 to 5.22). | | | | | | |
|---|---|---|---|---|---|---|
| Test | 5.17 | 5.18 | 5.19 | 5.20 | 5.21 | 5.22 |
| DS | 0.04 | 0.13 | 0.16 | 0.005 | 0.11 | 0.15 |
| Concentration (g/l) | 70 | 110 | 130 | 80 | 100 | 120 |

Figure 5:
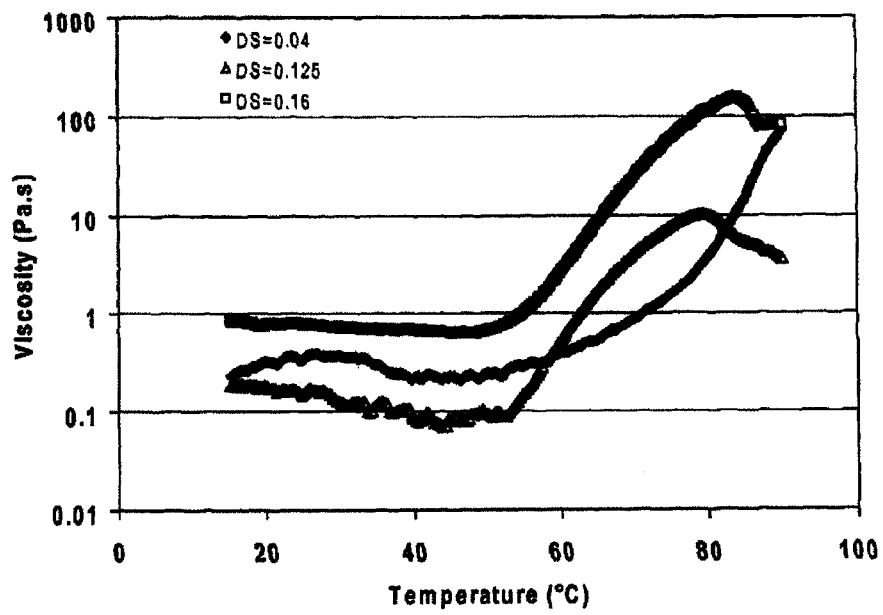
FIG. 5 depicts the change in the viscosity as a function of time for the solutions of PEG grafted guar of tests 5.17 to 5.19, respectively.
Figure 6:
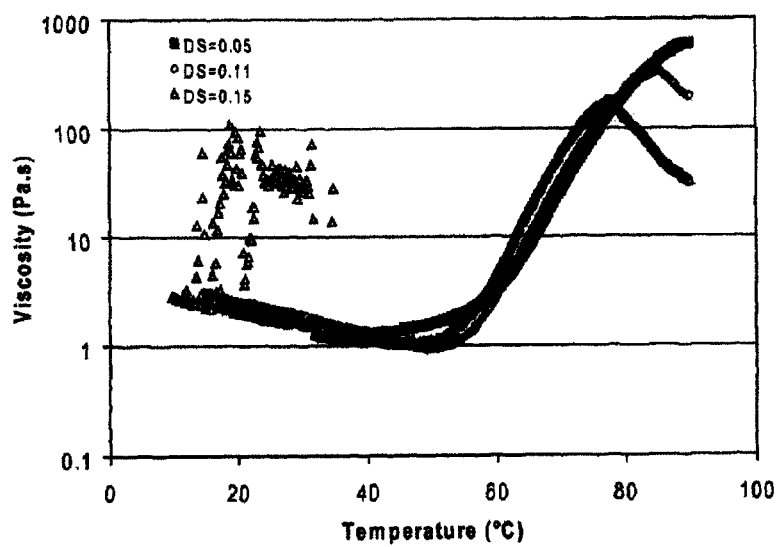
FIG. 6 depicts the change in viscosity as a function of time for the solutions of PEG grafted guar of tests 5.20 to 5.22, respectively.

The curves of the changes in viscosity are represented in FIGS. 5 and 6.

FIG. 5 shows the change in the viscosity as a function of time for tests 5.17 to 5.19.

FIG. 6 shows the change in viscosity as a function of time for tests 5.20 to 5.22.

The compounds based on guar with Mn=164 000 g·mol$^{-1}$ result in an increase of the viscosity of more than two decades starting from around 55° C. The product 5.20 was analyzed again under the same conditions, but with a shear frequency of 1 s$^{-1}$.

Figure 7:
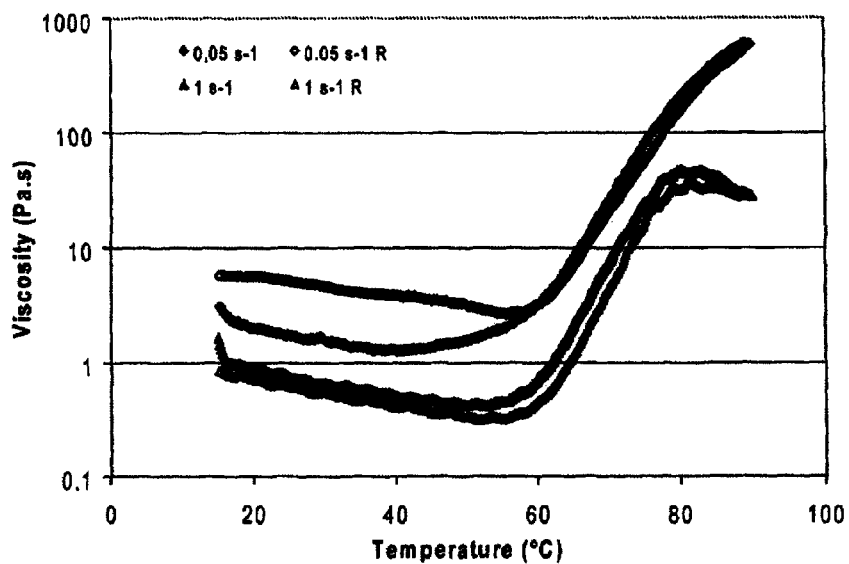
FIG. 7 depicts the change in the viscosity as a function of time at different shear rates for the solution of PEG grafted guar of test 5.20.

FIG. 7 shows the change in the viscosity as a function of time at two different shear rates for test 5.20.

The heat-sensitive properties are seen again. However, since this phenomenon is due to the formation of physical hydrophobic bonds during heating, an increase of the shear partially destroys these bonds and the viscosity measured at high temperature is therefore lower.

Example 6

Crosslinking of Guar Chains with a PEG-PPG Crosslinker by Click Chemistry

In this example, a novel method for the synthesis of guar-based hydrogels is described. By taking a water-soluble crosslinker with a functionality of azide functional groups greater than or equal to 2, it is possible to very easily envisage the synthesis of novel hydrogels with parameterizable physicochemical properties: LCST, pH sensitivity, etc. Such guar-based biomaterials may be used as controlled-release dispensers of active principles (Gliko-Kabir et al., *Phar. res.* 1998, 7, 1019-1025; Gliko-Kabir et al., *J. Contr. Rel.* 2000, 63, 121-127; Gliko-Kabir et al., *J. Contr. Rel.* 2000, 63, 129-134; Alhaique et al., *Eur. J. Phar. Biopharm.* 2007, 66, 200-209; Coviello et al., *Eur. Biophys. J.* 2007, 36, 693-700; Panariello et al., *Macromol. Symp.* 2008, 266, 68-73) or as organic substitutents that require a certain mechanical strength (Xiao et al., *Polym. Deg. Stab.* 2007, 92, 1072-1081; Coviello et al., *Eur. Polym. J.* 2007, 43, 3355-3367; Feitosa et al., *Macromol. Symp.* 2008, 266, 48-52; Mercuri et al., *Macromol. Symp.* 2008, 266, 74-80).

A PEG-PPG copolymer crosslinker of 2500 g·mol$^{-1}$ was used here.

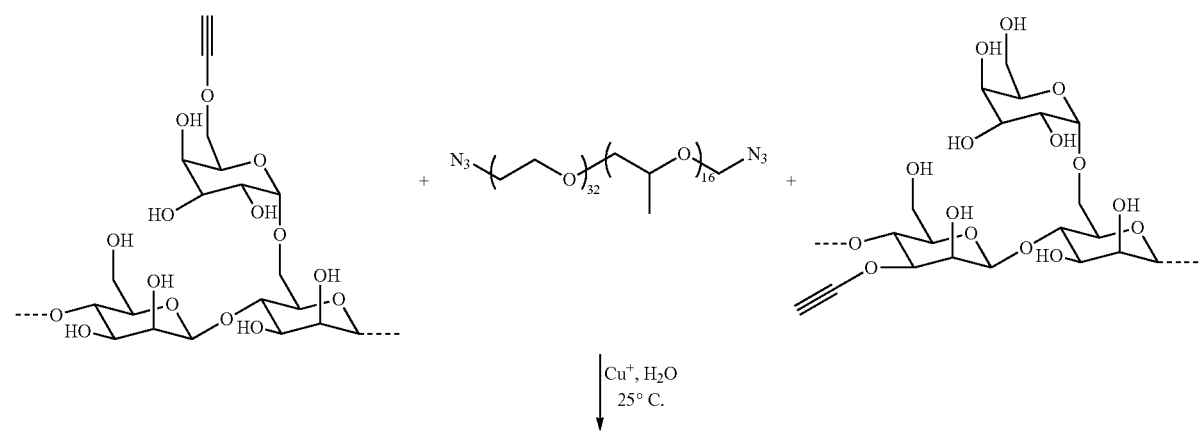

-continued

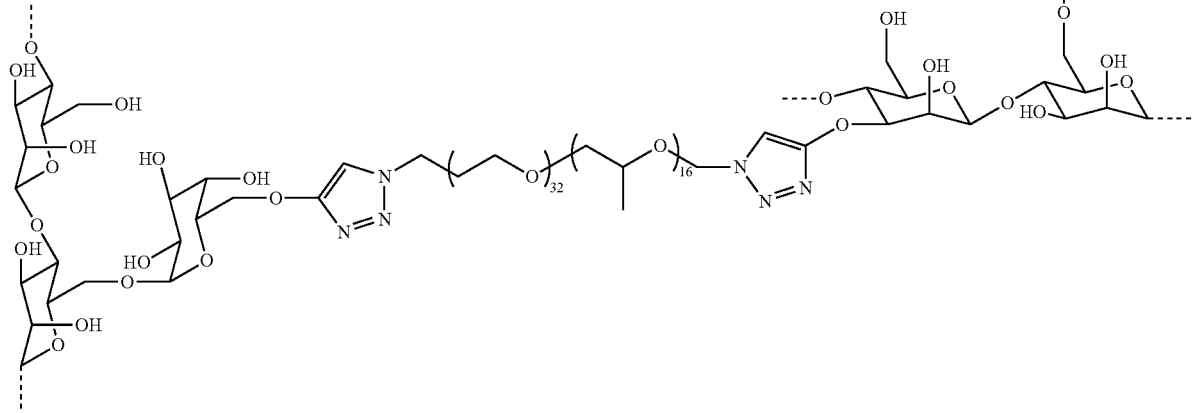

Crosslinking reaction of an alkyne-functionalized guar and of a diazide PEG/PPG copolymer via a "click chemistry" reaction.

Poured into a 30 ml glass flask are 8.3 g of distilled water and 600 mg of guar with $M_n$=26 200 g·mol$^{-1}$ having $DS_{alkyne}$ equal to 0.1. After solubilization of the guar, the following are added in order: 0.78 ml of a solution of sodium ascorbate in water (100 mg/ml)+473.7 mg of an α,ω-diazide functionalized telechelic polyoxy-ethylene/polyoxypropylene copolymer (denoted by POE/POP constituted of 2/3 OE units, 1/3 OP units) having a molar mass $M_n$=2500 g·mol$^{-1}$ that acts as a crosslinking agent. The flask is covered with aluminum foil and left stirring at ambient temperature for around 10 minutes. Next, 0.47 ml of a solution of CuSO$_4$.5H$_2$O in solution in water (10 mg/ml) is added. These conditions correspond to the following molar ratios:

≡/N$_3$/Cu$^{2+}$/Na asc=1/1/0.05/1 (mol %)

Figure 8:
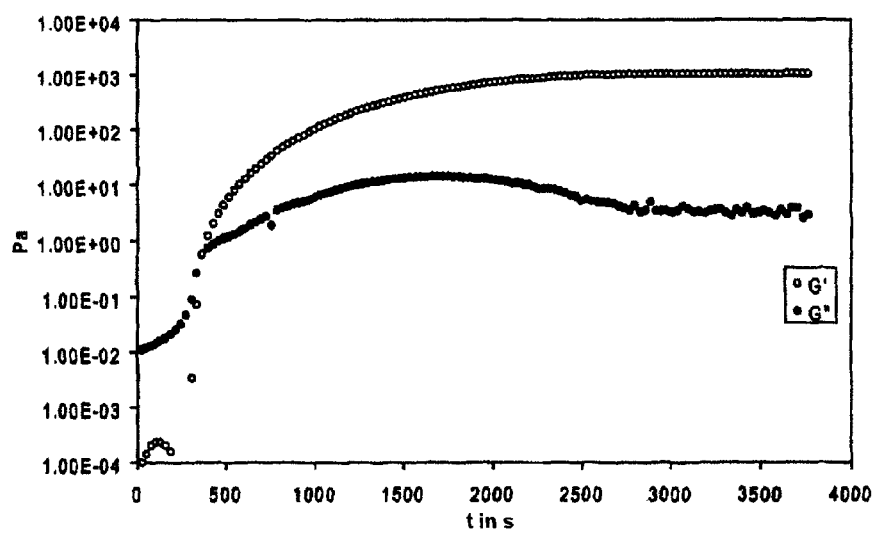
FIG. 8 depicts the change of the elastic plateau modulus (G') and of the viscous modulus (G") during the crosslinking of a guar by "click chemistry".

The whole assembly is then immersed in an oil bath with magnetic stirring at 25° C. for around 14 h. The gel time of the reaction, the elastic plateau modulus G' and the viscous modulus G" of the network thus formed are determined using an AR1000 rheometer (TA Instruments Inc.) (cone-plane geometry with a diameter of 60 mm, a gap of 2 μm and a frequency of 0.1 Hz, normal force exerted 150 mN). The gel time is defined by the time when G'=G" during the reaction, as indicated in FIG. 8, which shows the change of G' and of G" during the crosslinking of a guar by "click chemistry" (test 1).

Other products were synthesized following the same methodology and the same molar ratios. The variables are: the $DS_{alkyne}$ of the guar, $M_n$ of the guar and the concentration of solids (guar+POE/POP copolymer). For each sample, the conversion rate of the click chemistry reaction is determined by HR-MAS NMR analysis at 45° C. on hydrogels swollen in D$_2$O and the guar/crosslinking agent weight ratio is determined by thermogravimetric analysis under an inert atmosphere of nitrogen, with a heating rate of 10° C.·min$^{-1}$. Finally, measurements of swelling in water made it possible to determine the swelling ratio for each sample; $S_{eq}$ represents the ratio of the mass of water absorbed by a hydrogen to the mass of this dry hydrogel.

These results are given in table 5 below.

TABLE 5

Physicochemical properties of the hydrogels synthesized - Tests 6.1 to 6.15.

| $M_w$ in g·mol$^{-1}$ | Test | DS | % solids | $t_{gel}$ in s | G' in Pa | Guar/POE-POP weight ratio | Click chemistry reaction conversion | $S_{eq}$ 20° C. |
|---|---|---|---|---|---|---|---|---|
| 26200 | 6.1 | 0.1 | 5 | 390 | 1050 | 51.2/48.8 | ≈100% | 51.5 |
|  | 6.2 |  | 7.5 | 660 | 5600 | 53.1/46.9 | ≈100% | 22.9 |
|  | 6.3 |  | 10 | 480 | 10700 | 53.2/46.8 | ≈100% | 18.4 |
|  | 6.4 | 0.2 | 5 | 930 | 810 | 44.8/55.2 | ≈100% | 40.8 |
|  | 6.5 |  | 7.5 | 480 | 3000 | 43.7/56.3 | ≈100% | 22.3 |
|  | 6.6 |  | 10 | 420 | 7300 | 40.6/59.4 | ≈100% | 15.9 |
|  | 6.7 | 0.3 | 5 | 6500 | 300 | 32.9/67.1 | ≈100% | 27.6 |
|  | 6.8 |  | 7.5 | 1054 | 3800 | 32.8/67.2 | ≈100% | 17.1 |
|  | 6.9 |  | 10 | 900 | 6200 | 30.1/69.9 | ≈100% | 13.3 |
| 65500 | 6.10 | 0.1 | 5 | 7000 | 3700 | 52.4/47.6 | ≈100% | 29.7 |
|  | 6.11 |  | 7.5 | 3900 | 7500 | 48.0/52.0 | ≈100% | 19.0 |
|  | 6.12 |  | 10 | 2000 | 18000 | 48.8/51.2 | ≈100% | 11.6 |
| 164000 | 6.13 | 0.1 | 5 | 4600 | 1700 | 50.7/49.3 | ≈100% | 28.2 |
|  | 6.14 |  | 7.5 | 2000 | 6500 | 51.5/48.4 | not measured | 17.9 |
|  | 6.15 |  | 10 | 460 | 11700 | 50.5/49.5 | not measured | 16.5 |

By varying various parameters during the synthesis, a wide range of guar-based hydrogels with adjustable mechanical and swelling properties are obtained.

Figure 9:
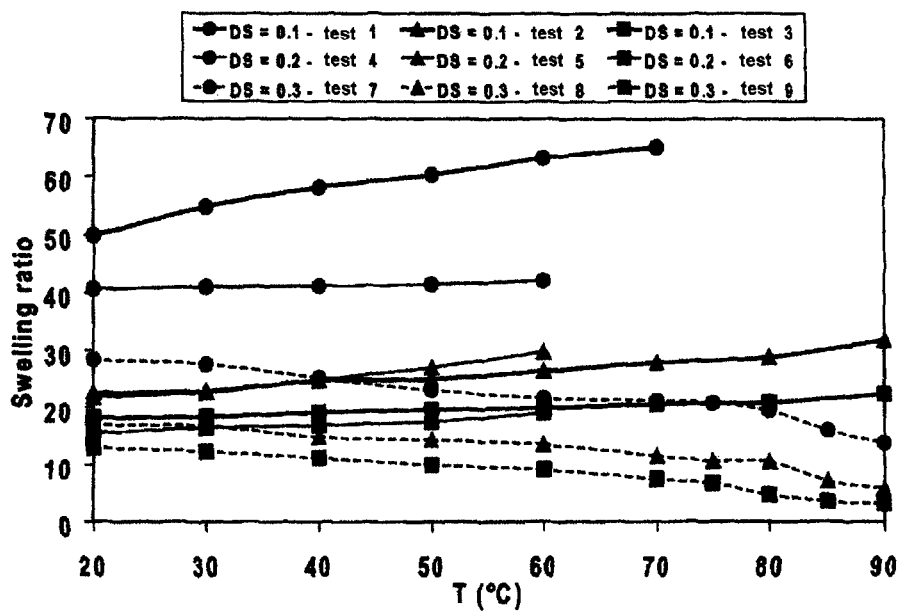
FIG. 9 depicts the changes in the swelling ratios at equilibrium for tests 6.1 to 6.9.

Although most of the products swell more in the presence of solvent during an increase in temperature, this is not the case for tests 6.7 to 6.9. Although the same heat-sensitive crosslinker was used for all of them, only these products with a sufficient crosslinker weight fraction have an "LCST" character, that is to say that they fold up on themselves instead of swelling during a rise in temperature. In FIG. 9 the changes in the swelling ratios $S_{eq}$ at equilibrium are represented for the tests 6.1 to 6.9.

Figure 10:
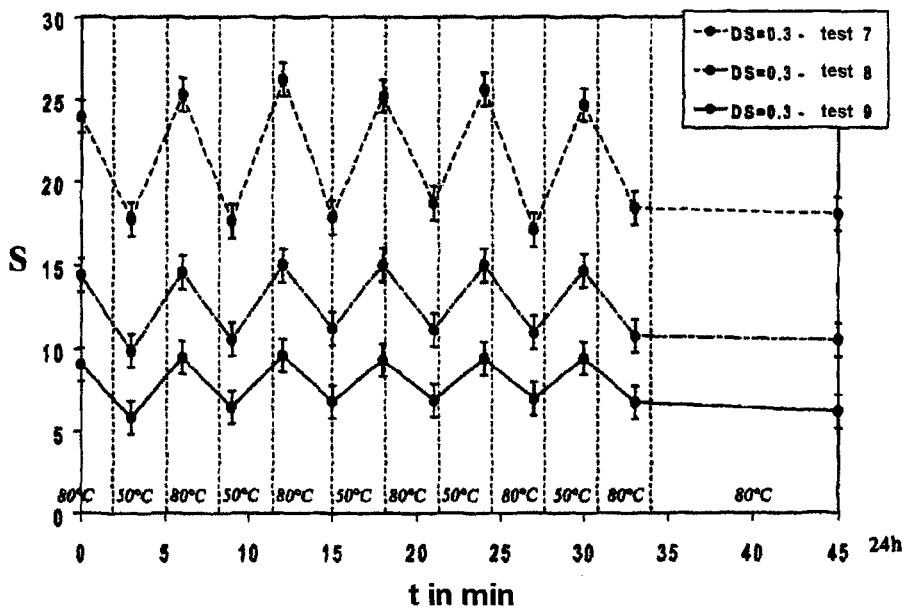
FIG. 10 depicts the water absorption/release experiments on tests 6.7 to 6.9.

It is seen in FIG. 9 that only the products 6.7 to 6.9 prepared from a guar with a $DS_{alkyne}$ equal to 0.3 fold up on themselves during an increase in temperature. The products 6.7 to 6.9 are characterized by a speed of absorption and of expulsion of the water that they contain. When they are immersed in the water at a given temperature, they very rapidly reach their equilibrium state. Represented in FIG. 10 are the water absorption/release experiments on tests 6.7 to 6.9. The products are immersed successively in baths of water thermostatted at 50° C. and 80° C. for 3 min. It can be seen that the phenomenon is completely reversible and very rapid.

The invention claimed is:

1. A hybrid compound comprising a polysaccharide (PS) which comprises hydroxyl functional groups wherein at least one portion of the hydroxyl functional groups is substituted with an -Ro-A group wherein:

Ro is a linking unit of formula (II.1),

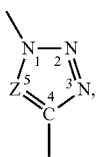
(II.1)

wherein said unit is connected to A at position 1 thereof and to PS at position 4 thereof or is connected to PS at position 1 thereof and to A at position 4 thereof, or is a linking unit of formula (II.2),

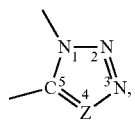
(II.2)

wherein said unit is connected to A at position 1 thereof and to PS at position 5 thereof or is connected to PS at position 1 thereof and to A at position 5 thereof;

wherein Z represents a carbon or nitrogen atom;

each A independently represents a group of formula (III):
-[-$A^1$-O—]$_n$-$A^2$-O-$A^3$ (III) wherein:
n is greater than 0,
$A^1$ and $A^2$, which are identical or different, comprise optionally substituted divalent alkylene groups, and
$A^3$ is a hydrogen atom, an optionally substituted aryl or alkyl group, or a polysaccharide; and wherein said substitution of a hydroxyl group on said PS by said Ro-A group results in said Ro-A group being connected to said PS by an —O— linkage formed from the oxygen of said hydroxyl group.

2. The hybrid compound of claim 1, wherein the polysaccharide PS comprises at least one main polysaccharide chain, optionally bearing pendent saccharide groups.

3. The hybrid compound of claim 1, wherein entity PS comprises a hydrogenated or non-hydrogenated polysaccharide comprising at least two monosaccharide units.

4. The hybrid compound of claim 3, wherein the said hydrogenated or non-hydrogenated polysaccharide is:

a polysaccharide comprising units derived from: glucose, fructose, sorbose, mannose, galactose, talose, allose, gulose, idose, glucosamine, mannoamine, galactosamine, glucuronic acid, rhamnose, rhamnose sulfate, arabinose, galacturonic acid, fucose, xylose, lyxose, or ribose;

a polysaccharide comprising units derived from: maltose, gentiobiose, lactose, cellobiose, isomaltose, melibiose, laminaribiose, chitobiose, xylobiose, mannobiose, sophorose, or palatinose;

a polysaccharide comprising units derived from at least one: maltotriose, isomaltotriose, mannotriose, mannitriose, or chitotriose;

a starch;

a cellulose;

a galactomannan;

a chitin or chitosan;

a bacterial polysaccharide; or hyaluronic acid.

5. The hybrid compound of claim 1, wherein entity PS comprises at least one galactomannan.

6. The hybrid compound of claim 1, wherein entity PS is substituted by at least one group that is not -Ro-A.

7. The hybrid compound of claim 1, wherein:

$A^1$ and/or $A^2$ comprise ethylene, propylene, or trimethylene, and units -[-$A^1$-O—]$_n$ are arranged in a random or block form.

8. The hybrid compound of claim 1, wherein the ratio of the average number of moles of alkylene oxide chain members grafted per monosaccharide unit to the average number of OHs substituted per monosaccharide unit of PS ranges from 5 to 500.

9. The hybrid compound of claim 1, wherein the average number of moles of alkylene oxide chain members grafted per monosaccharide units is greater than 0.

10. The hybrid compound of claim 1, wherein the average number of OHs substituted per monosaccharide unit of PS is greater than 0.

11. A hybrid compound comprising a polysaccharide (PS) which comprises hydroxyl functional groups wherein at least one portion of the hydroxyl functional groups is substituted with an -Ro-A group wherein:

Ro is a linking unit of formula (II.1),

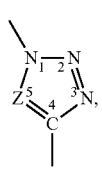
(II.1)

wherein said unit is connected to A at position 1 thereof and to PS at position 4 thereof, or Ro is a linking unit of formula (II.2),

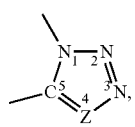
(II.2)

wherein said unit is connected to A at position 1 thereof and to PS at position 5 thereof;
wherein Z represents a carbon or nitrogen atom; and
each A independently represents a group of formula (III):
-[-A$^1$-O—]$_n$-A$^2$-O-A$^3$ (III) wherein:
n is greater than 0,
A$^1$ and A$^2$, which are identical or different, comprise optionally substituted divalent alkylene groups, and
A$^3$ is a hydrogen atom, an optionally substituted aryl or alkyl group, or a polysaccharide.

12. The hybrid compound of claim 1, wherein:
when Ro is a linking unit of formula II.1, it is connected to PS at position 1 thereof and to A at position 4 thereof; and
when Ro is a linking unit of formula II.2, it is connected to PS at position 1 thereof and to A at position 5 thereof.

13. A synthon PS-X, wherein:
PS comprises at least one galactomannan, and
at least one reactive unit X comprising at least one reactive end of formula:

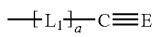

wherein:
E represents CH or N,
a is 1, and
L$_1$ is a divalent hydrocarbon group or an amine group that has reacted with the functionalizing group(s) of the PS.

14. The synthon PS-X of claim 13, wherein:
(i) PS comprises at least one saccharide comprising hydroxyl groups, and
L$_1$ is derived from a precursor comprising at least one halo group reacted with one or more of said hydroxyl groups of the PS; or
(ii) PS comprises at least one residue functionalized by at least one carboxylic, carboxylate, anhydride, thiol, isocyanate or epoxide functionalizing group, and
L$_1$ comprises at least one amine group that has reacted with the functionalizing group(s) of the PS, and/or
L$_1$ is derived from a precursor comprising at least one halo group that has reacted with the functionalizing group(s) of the PS.

15. A mixed synthon A-XY wherein A comprises a group of the formula: -[-A$^1$-O—]$_n$-A$^2$-O-A$^3$ wherein:
n is greater than 0,
A$^1$ and A$^2$, which are identical or different, comprise optionally substituted divalent alkylene groups, and
A$^3$ is a hydrogen atom, an optionally substituted aryl or alkyl group, or a polysaccharide;
said mixed synthon comprising at least one reactive unit X comprising at least one reactive end of formula:

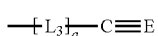

wherein:
E is CH or N,
a is 0 or 1,
said reactive end is connected to the residue A by a bond L$_3$ which is a divalent hydrocarbon group, and
when a is 0, A is not a polysaccharide;
and at least one reactive unit Y having at least one reactive end of formula:

with a being 0 or 1, said reactive end being coupled to the residue A by a bond L$_4$ which is a divalent hydrocarbon bond, wherein when a is 0, A is not a polysaccharide.

16. A composition comprising the hybrid compound of claim 1, wherein said composition is adapted for use as:
an institutional, industrial or domestic care composition;
a cosmetic composition;
a composition for the treatment of textiles;
a coating composition;
a construction composition;
a hydraulic fluid;
a composition for the exploitation of oil reservoirs and/or gas fields;
a metal or plastic treatment composition;
an agrochemical composition;
a paint composition;
a paper coating composition;
a dispersant composition;
a scale-inhibiting composition;
a colloid-protecting composition; or
a rheological composition.

17. A process for obtaining the hybrid compound of claim 1, comprising:
(i) preparing a synthon PS-X and/or a synthon A-X comprising at least one reactive unit X comprising at least one reactive end of formula —C≡E,
wherein E represents CH or N;
(ii) preparing a synthon A-Y and/or a synthon PS-Y comprising at least one reactive unit Y comprising at least one reactive end of formula —N$_3$,
wherein the reactive end, —N$_3$ is capable of reacting with the reactive end —C≡E;
(iii) reacting the synthon PS-X and/or the synthon A-X with the synthon A-Y and/or the synthon PS-Y by a cycloaddition reaction to obtain said hybrid compound, wherein PS comprises hydroxyl functional groups, at least a portion of which are substituted by an -Ro-A group;
(iv) optionally washing a solvent employed in reacting step (iii) and removing solvent and/or residues when said process is performed in the heterogeneous or solid phase; and,
(v) optionally separating and recovering said hybrid compound from a reaction medium.

18. The process of claim 17, wherein the reacting step is carried out in an aqueous, aqueous-alcoholic or organic medium capable of solubilizing and/or swelling the synthon PS-X and/or the synthon A-Y, with least one metal catalyst in ionized form and at least one reducing agent.

19. The process of claim 18, wherein said process is performed in a reaction medium comprising at least one solvent comprising:

an aprotic polar solvent;
a protic polar solvent;
an apolar solvent;
water; or
mixtures thereof.

20. The process of claim 17, wherein the optional separating and recovering of said hybrid compound from said reaction medium comprises performing:
- at least one chromatography with an eluent comprising a mixture of a first polar solvent and at least a second less polar solvent; and/or
- at least one evaporation whereby a product is dried.

* * * * *